United States Patent
Swan et al.

(10) Patent No.: US 10,717,537 B2
(45) Date of Patent: Jul. 21, 2020

(54) PARACHUTE TOW AND RELEASE SYSTEM WITH CANOPY EXTRACTION CONTROLLED BY DRAG SURFACE

(71) Applicant: Kitty Hawk Corporation, Mountain View, CA (US)

(72) Inventors: Peter A. Swan, West Sacramento, CA (US); Craig Western, San Francisco, CA (US); Damon Vander Lind, East Palo Alto, CA (US); Amy Qian, Sunnyvale, CA (US); Timothy Mattson, San Jose, CA (US); Eric Miller, Santa Cruz, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 0 days.

(21) Appl. No.: 16/107,861

(22) Filed: Aug. 21, 2018

(65) Prior Publication Data
US 2019/0112058 A1    Apr. 18, 2019

Related U.S. Application Data

(63) Continuation of application No. 15/951,987, filed on Apr. 12, 2018, now Pat. No. 10,099,792, which is a (Continued)

(51) Int. Cl.
*B64D 17/38* (2006.01)
*B64D 17/80* (2006.01)

(52) U.S. Cl.
CPC ............ *B64D 17/38* (2013.01); *B64D 17/80* (2013.01)

(58) Field of Classification Search
CPC ........ B64D 17/36; B64D 17/38; B64D 17/68; B64D 17/78
See application file for complete search history.

(56) References Cited

U.S. PATENT DOCUMENTS 3,776,493 A * 12/1973 Matsuo ................. B64D 17/68
                                                               244/147
3,913,873 A    10/1975 Nimylowycz
(Continued)

FOREIGN PATENT DOCUMENTS

DE    3329490        3/1985
FR    2989064 A1 * 10/2013 ............. B64D 17/50

OTHER PUBLICATIONS

Author Unknown, BRS-182 System Description, Dec. 2, 2004, pp. 1-11, Ballistic Recovery Systems, Inc.
(Continued)

*Primary Examiner* — Brian M O'Hara
(74) *Attorney, Agent, or Firm* — Van Pelt, Yi & James LLP

(57) ABSTRACT

In an embodiment, a parachute deployment system includes a parachute coupled to a release via a first load path. The first path includes crown lines. The release is adapted to attach the parachute to a rocket via the crown lines, and disengage the parachute from the rocket if a load shifts from the first path to a second path. The system also includes a line constrainer between the release and the parachute. The crown lines pass through the line constrainer, and the line constrainer is adapted to restrict an extent to which the crown lines are able to extend away from a longitudinal axis. An example release includes a back plate configured to couple a tow line to crown lines and a soft pin. The pin is adapted to separate from the back plate in response to tensioning of the release line, causing the parachute to disengage.

23 Claims, 19 Drawing Sheets

Related U.S. Application Data continuation-in-part of application No. 15/783,909, filed on Oct. 13, 2017, now Pat. No. 9,981,749.

(56) References Cited

U.S. PATENT DOCUMENTS

| | | | |
|---|---|---|---|
| 4,004,764 A | | 1/1977 | Burklund |
| 4,428,102 A * | | 1/1984 | Brownell ............... B64D 17/38 24/573.11 |
| 4,637,577 A * | | 1/1987 | Miseyko ............... B64D 25/10 244/142 |
| 5,005,785 A | | 4/1991 | Puskas |
| 5,878,979 A | | 3/1999 | Fisher |
| 5,899,414 A | | 5/1999 | Duffoo |
| 6,487,951 B1 | | 12/2002 | Petkantchin |
| 7,118,073 B2 * | | 10/2006 | Booth .................... B64D 17/38 244/149 |
| 8,074,934 B2 * | | 12/2011 | Fradet ................... B64D 17/38 244/147 |
| 10,059,459 B2 | | 8/2018 | Clark |
| 2013/0175398 A1 | | 7/2013 | Chia |
| 2015/0314881 A1 | | 11/2015 | Tsaliah |
| 2016/0251083 A1 | | 9/2016 | Tsaliah |
| 2017/0233086 A1 | | 8/2017 | Homan |

OTHER PUBLICATIONS

Author Unknown, Galaxy GRS Ballistic Parachute Rescue System Instruction Manual for Assembly and Use, Mar. 21, 2016, pp. 1-41.

Author Unknown, Magnum Ballistic Rescue Parachute Systems Series Magnum Installation and User's Manual, Feb. 2014, pp. 1-68.

Author Unknown, Slider (parachuting), Wikipedia, Oct. 28, 2016, https://en.wikipedia.org/w/index.php?title=Slider_(parachuting)&oldid=746685769.

Author Unknown, Apollo (spacecraft), Wikipedia, Jul. 9, 2018, https://en.wikipedia.org/wiki/Apollo_(spacecraft).

Author Unknown, High-Altitude Military Parachuting, Wikipedia, Jul. 31, 2018, https://en.wikipedia.org/w/index.php?title=High-altitude_military_parachuting&oldid=852804608.

Author Unknown, Mk12 Ejection Seat, Martin-Baker.com, Aug. 9, 2018.

Author Unknown, Soyuz (spacecraft), Wikipedia, Aug. 10, 2018, https://en.wikipedia.org/wiki/Soyuz_(spacecraft).

Author Unknown, SpaceX Dragon, Wikipedia, Aug. 6, 2018, https://en.wikipedia.org/wiki/SpaceX_Dragon.

Theo W. Knacke, Parachute Recovery Systems Design Manual, Mar. 1991, pp. 5-42, 5-43, 5-121 to 5-130, 6-10, and 6-38 to 6-40, Para Publishing.

* cited by examiner a
PARACHUTE TOW AND RELEASE SYSTEM WITH CANOPY EXTRACTION CONTROLLED BY DRAG SURFACE

CROSS REFERENCE TO OTHER APPLICATIONS

This application is a continuation of U.S. patent application Ser. No. 15/951,987, now U.S. Pat. No. 10,099,792, entitled PARACHUTE TOW AND RELEASE SYSTEM WITH CANOPY EXTRACTION CONTROLLED BY DRAG SURFACE filed Apr. 12, 2018, which is a continuation-in-part of U.S. patent application Ser. No. 15/783,909, now U.S. Pat. No. 9,981,749, entitled PARACHUTE DEPLOYMENT SYSTEM USING DECOUPLED TOW AND RELEASE LINES filed Oct. 13, 2017, both of which are incorporated herein by reference for all purposes.

BACKGROUND OF THE INVENTION

Aircraft or payload recovery may be required at low altitude, low speed conditions. For example, an aircraft may be hovering or transitioning between stages of flight and this transition (e.g., depending on flight conditions) can occur immediately after takeoff (e.g., on the order of a few meters). Low altitude conditions necessitate a parachute that opens with minimal altitude loss. Low speed conditions may present a lack of a strong airstream that can quickly inflate a parachute. In order to avoid high velocity impact and ensure occupant or payload safety, a parachute deployment system is required that quickly extracts a parachute at low altitude, low speed conditions.

In some embodiments, a self-propelled projectile such as a rocket is used to quickly extract the parachute from the aircraft or other payload. The self-propelled projectile may present hazards or undesired weight if left attached to the parachute following parachute extraction. The extra line length may also constrict or interfere with the canopy as it inflates. Releasing the self-propelled projectile at full extension under high line loads may result in parachute recoil, unpredictable parachute deployment, and/or altitude loss. New parachute systems which work with a self-propelled projectile but mitigate recoil when the projectile and aircraft disconnect would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A parachute tow and release system with canopy extraction controlled by a drag surface is disclosed. The techniques described here include parametrically tuning extension damping and air inflow to reduce recoil and decrease parachute inflation time. In some embodiments, a parachute deployment system includes a parachute coupled to a release via a first load path. The first load path includes parachute lines attached to a crown of the parachute. These parachute lines are called upper parachute lines or crown lines. The system includes a release adapted to attach the parachute to a rocket via the upper parachute lines, and disengage the parachute from the rocket if a load shifts from the first load path to a second load path. The system includes a line constrainer provided between the release and the parachute. The upper parachute lines pass through the line constrainer, and the line constrainer is adapted to restrict an extent to which the upper parachute lines are able to extend away from a longitudinal axis of the parachute.

Figure 10B:
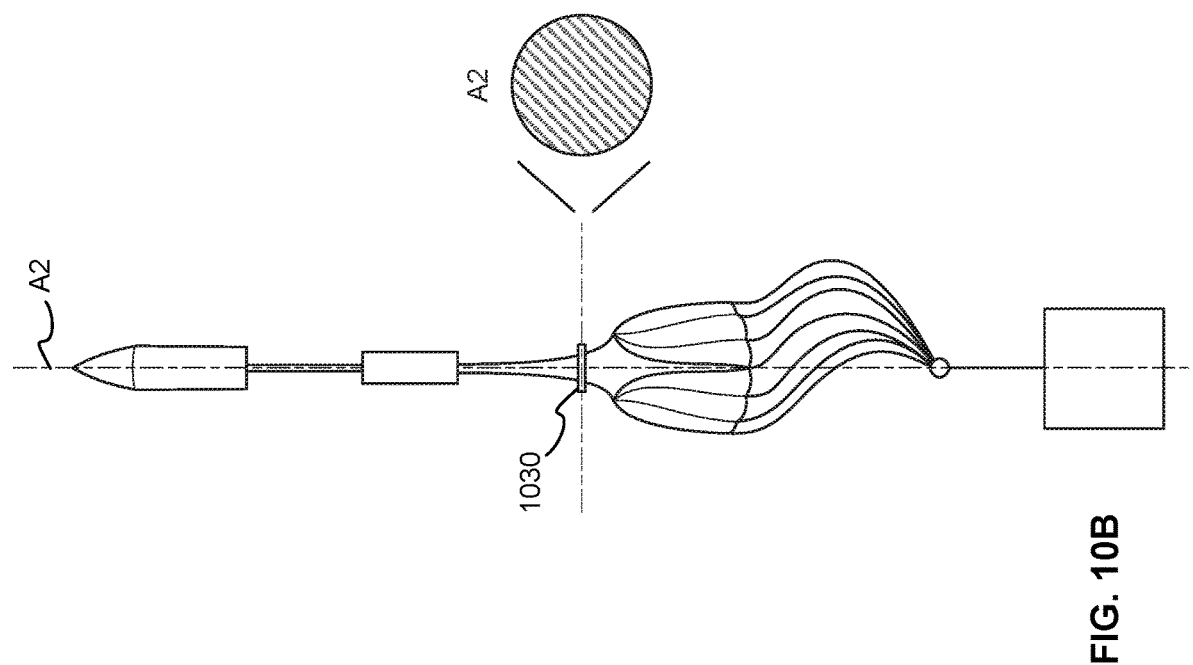
FIG. 10B is a diagram illustrating an embodiment of a parachute deployment system including a line constrainer associated with a second area, A2.
Figure 10A:
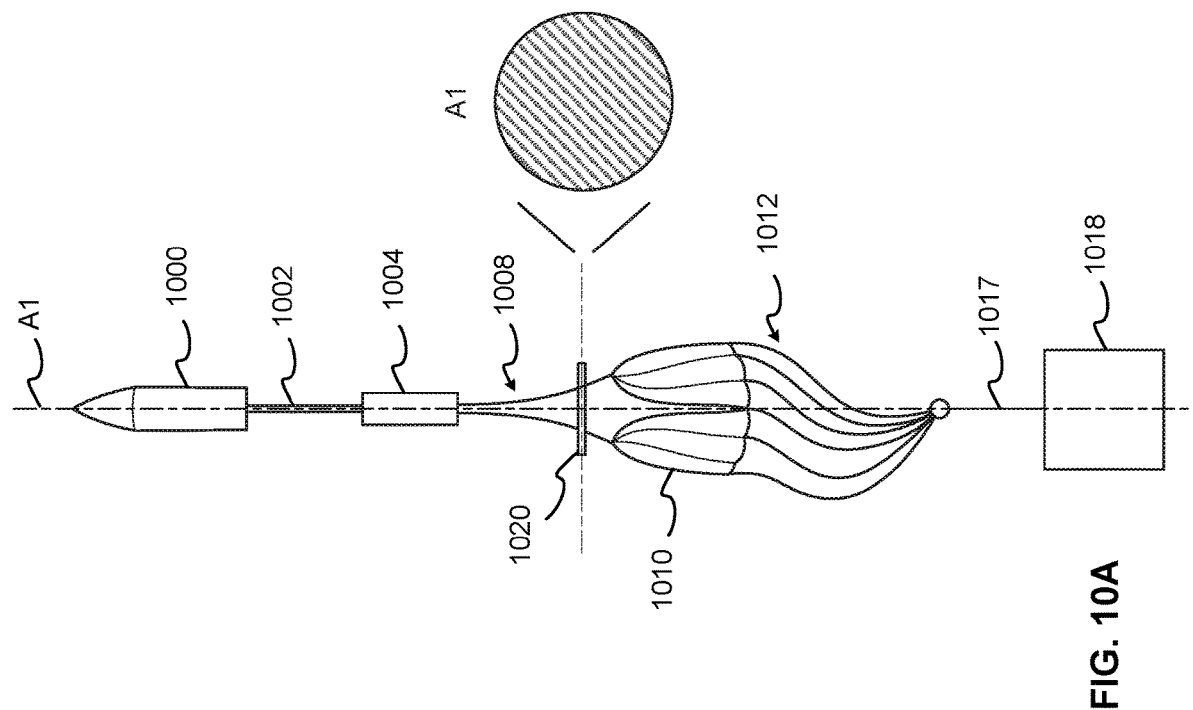
FIG. 10A is a diagram illustrating an embodiment of a parachute deployment system including a line constrainer associated with a first area, A1.

In various embodiments, the first load path further includes one or more lower parachute lines (also called suspension lines). The system includes a lower parachute line restrainer which, when released, permits the lower parachute line(s) to extend to full length. The full extension of the lower parachute line(s) causes the load to shift from the first load path to the second load path. The second load path includes a release line that becomes taut when the load shifts. Consequently, the parachute is disengaged from the rocket via the release, the release line and upper parachute lines separate from the release, and the rocket assembly propels itself away from the main parachute assembly. In some embodiments, the upper parachute lines function as tow lines. That is, the same set of lines are both upper parachute lines and tow lines. An example of a parachute deployment system in which the upper parachute lines and tow lines are the same is shown in FIGS. 10A and 10B. The second load path, in various embodiments, includes a release line.

First, some embodiments of a parachute system without a line constrainer (e.g., on or around the upper parachute lines) are described. This enables a simpler and/or clearer explanation of how the load shifting from a first load path to a second load path enables a rocket to be released or otherwise decoupled from the parachute (e.g., without the added complexity of having to discuss a line constrainer). Then, some embodiments of a parachute system with a line constrainer on the upper parachute lines are described. This enables the discussion of those later embodiments to focus more clearly and/or easily on those line constrainer embodiments and how they further improve the parachute system.

Quickly extracting the parachute using a rocket exerts a high load on at least one line (e.g., the rocket tow line and also the upper parachute lines or crown lines) connecting the rocket and the parachute. The rocket is released or otherwise disconnected from the parachute following parachute extraction for various reasons. For example, if the rocket remains attached, it may present a fire hazard to the parachute, add undesirable weight to the parachute and payload, and/or cause the parachute to move in an undesirable and/or unpredictable manner. The additional line length may constrict the fabric of the canopy and may prevent the parachute from opening freely. The manner in which the rocket is released or otherwise disconnected from the parachute must be carefully considered. For example, severing (e.g., directly cutting) the line that connects the rocket and the parachute while the line is under high load (e.g., because the rocket is pulling the line taut) causes the line and/or parachute to recoil. Recoil of the parachute may result in unpredictable inflation, line tangling, and/or altitude loss, and is therefore undesirable.

The amount of recoil can be tuned according to the techniques described here. Recoil can be controlled by adjusting, for example, the amount of damping or drag induced by a surface moving through the air as the parachute is extracted or extended. A high level of damping corresponds to less recoil. A low level of damping corresponds to more recoil. As more fully described below, extension damping is tuned by controlling the extent to which upper parachute lines are permitted to extend away from a longitudinal axis of the parachute. Tunable extension damping finds application in a variety of flying conditions. For example, when an aircraft is intended to fly relatively close to the ground, recoil is undesirable because the more recoil there is, the more likely that the aircraft will lose altitude and hit the ground. Thus, for low-flying aircraft, the extension damping of the parachute can be tuned to having a high level of damping. Conversely, for relatively high flying aircraft, there is greater tolerance for altitude loss/recoil, and the extension damping can be tuned to have a relatively lower level of damping.

In some embodiments, a parachute deployment system comprises a tow line, a set of upper parachute lines (crown lines), a (e.g., separate) release line, and a line constrainer. The line constrainer is adapted to restrict an extent to which the upper parachute lines are able to extend away from a longitudinal axis of the parachute. In some embodiments, restricting the extension of the upper parachute lines allows extension damping to be tuned to reduce recoil. In some embodiments, both the tow and release lines are attached to a release which connects the rocket and the parachute and (e.g., at the appropriate time or condition) disconnects the rocket and the parachute from each other. In some embodiments, having a separate tow line and release line allows the parachute to be extracted quickly (e.g., using the tow line where the tow line is taut and the release line is slack) and the rocket to be released smoothly (e.g., when the release line becomes taut). In the disclosed system, the tow line first takes the load of the payload. That is to say, the tow line is part of a load path that connects the rocket to the payload. The load path may comprise the tow line, upper lines of the parachute or crown lines, suspension lines of the parachute, and a riser of the parachute. In some embodiments, various parts of the parachute (e.g., the lines, the riser, etc.) are constructed of nylon because nylon is better for shock absorption. In some embodiments, the release line is situated (e.g., runs) parallel to the tow line but is slack and bears no load (at least initially). A lower parachute line restrainer (at least in some embodiments) is configured to release under a threshold force and may release after a canopy of the parachute is fully extracted. In some embodiments, release of the lower parachute line restrainer causes the load to shift from the tow line to the release line. For example, the release line begins to be pulled taut. In some embodiments, the load is shifted by changing relative lengths of the lines. Due to the load on the release line, the release opens. In some embodiments, the release opens under a small load. The opening of the release causes the rocket and the parachute to detach.

Figure 1:
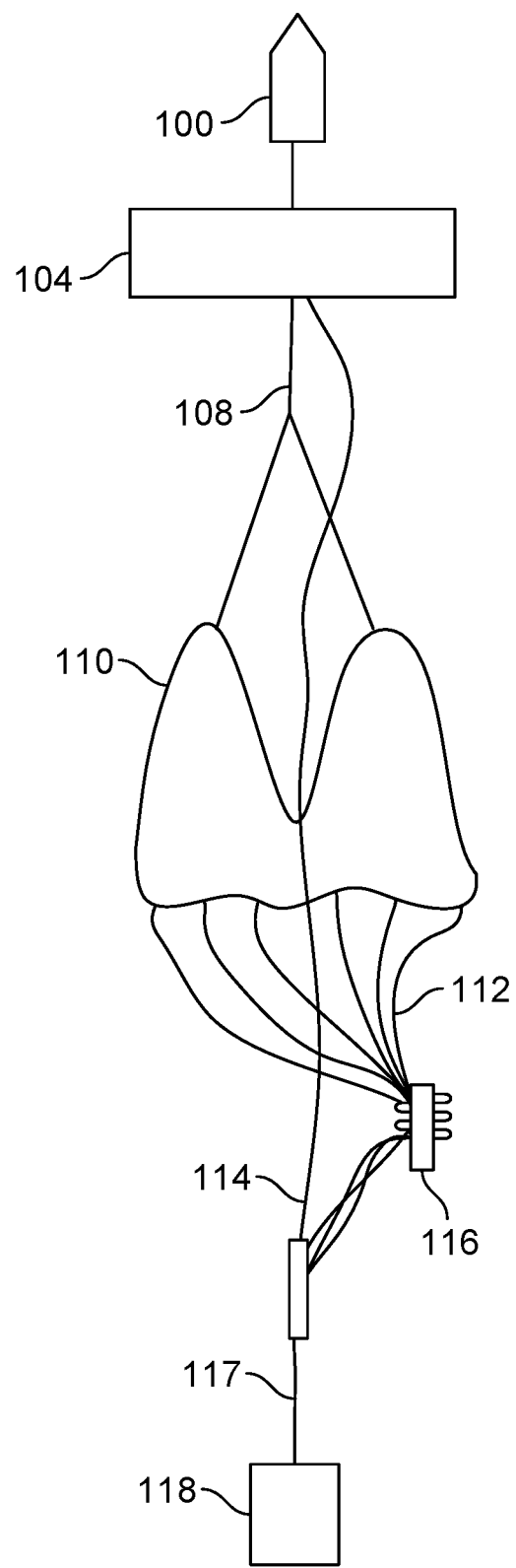
FIG. 1 is a diagram illustrating an embodiment of a parachute deployment system.

FIG. 1 is a diagram illustrating an embodiment of a parachute deployment system. In the example shown, rocket 100 is tethered to release 104. In some embodiments, rocket 100 is permanently attached or connected to release 104. For example, release 104 is designed to remain with rocket 100 following separation of rocket 100 and canopy 110. In various embodiments, release 104 comprises a latch, a cutter, a pin, or any other appropriate release. As will be described in more detail below, the release is designed to disconnect the rocket from the rest of the aircraft (including the parachute) with minimal recoil.

Tow line 108 is attached to release 104 at its upper end. At its lower end, tow line 108 is attached to canopy 110 via the upper parachute lines. Upper parachute lines are attached to the canopy in the middle of the canopy, between an apex and outer edge of the canopy. In some embodiments, attaching the upper parachute lines to the middle of the canopy or lower on the canopy than its apex allows lower sections of the canopy to be pulled out quickly, which helps when the aircraft is at a low altitude, and provides even distribution of tension across all lower parachute lines. In various embodiments, tow line 108 is attached to canopy 110 using 4, 10, 20, or any appropriate number of upper parachute lines. The upper parachute lines are positioned equidistant around the canopy. In some embodiments, the canopy is packed and initially extracted in an "M" cross-sectional shape which inflates more quickly than a typical cylindrical shape. For example, the apex of the canopy is packed in an inverted position.

Suspension lines 112 extend from canopy 110. In various embodiments, various numbers of suspension lines are used. A portion of the suspension lines is folded up and held in lower parachute line restrainer 116. In various embodiments, lower parachute line restrainer 116 comprises a bight, a tied or sewed cloth, a thin plastic tube, a cardboard loop, or any appropriate restrainer that holds the suspension lines such that their lengths are effectively shortened. The lower parachute line restrainer is configured to release under a threshold force (e.g., due to the rocket). For example, the lower parachute line restrainer is configured to break, rip, tear, or open under the threshold force. The suspension lines 112 and release line 114 are attached at their bottom ends to riser 117.

In various embodiments, riser 117 comprises one line, multiple lines, or webbing. Riser 117 is attached to payload 118. In some embodiments, payload 118 comprises an aircraft.

In some embodiments, the release line is tied directly from the release to the bottom of the suspension lines. In some embodiments, the release line is tied to the apex, which in turn is tied to the center line. The center line extends from an apex of the canopy to a confluence point at the bottom of the suspension lines. In some embodiments, the release line is tied directly to the center line.

The following figures show examples of the exemplary parachute deployment system at various points in time in order to better illustrate how the parachute deployment system works and how it is able to disconnect the rocket with little or no recoil.

Figure 2A:
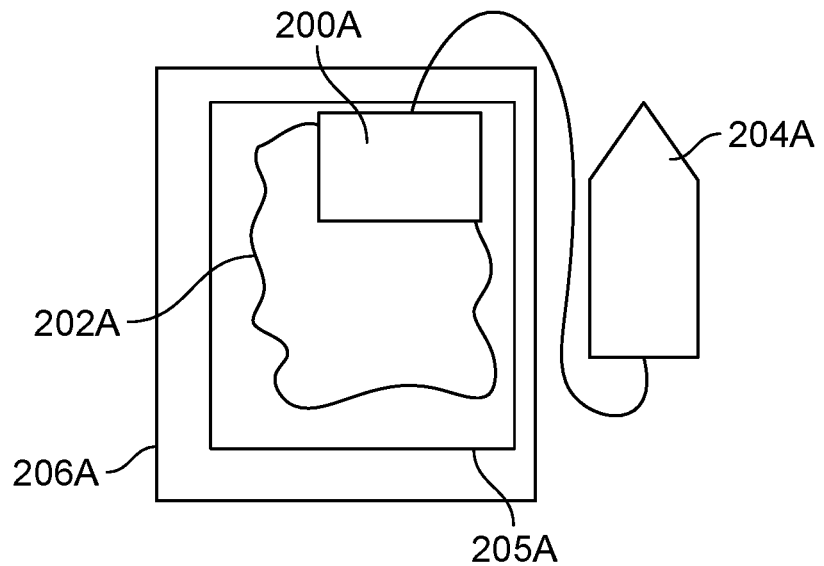
FIG. 2A is a diagram illustrating an embodiment of a parachute deployment system in a stowed state.

FIG. 2A is a diagram illustrating an embodiment of a parachute deployment system in a stowed state. In the example shown, a parachute is stowed inside can 205A. Canopy 202A is folded and stored in the can along with release 200A. The can is stored on or in payload 206A, which may comprise a cavity or compartment in an aircraft where the parachute deployment system is stored. Rocket 204A is positioned externally to the can.

Figure 2B:
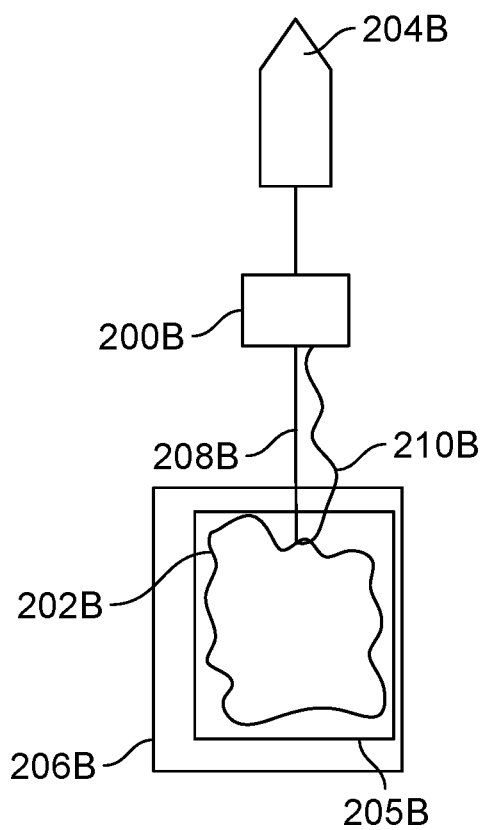
FIG. 2B is a diagram illustrating an embodiment of a parachute deployment system following rocket deployment.

FIG. 2B is a diagram illustrating an embodiment of a parachute deployment system following rocket deployment. Upon triggering the parachute deployment system, rocket 204B begins traveling upwards away from payload 206B. The rocket is attached to and tows release 200B. Release 200B in turn is attached to the parachute via tow line 208B and release line 210B. Canopy 202B remains folded inside of can 205B. It is noted that in the state shown here, the tow line 208B is taut and the release line 210B is slack.

Figure 2D:
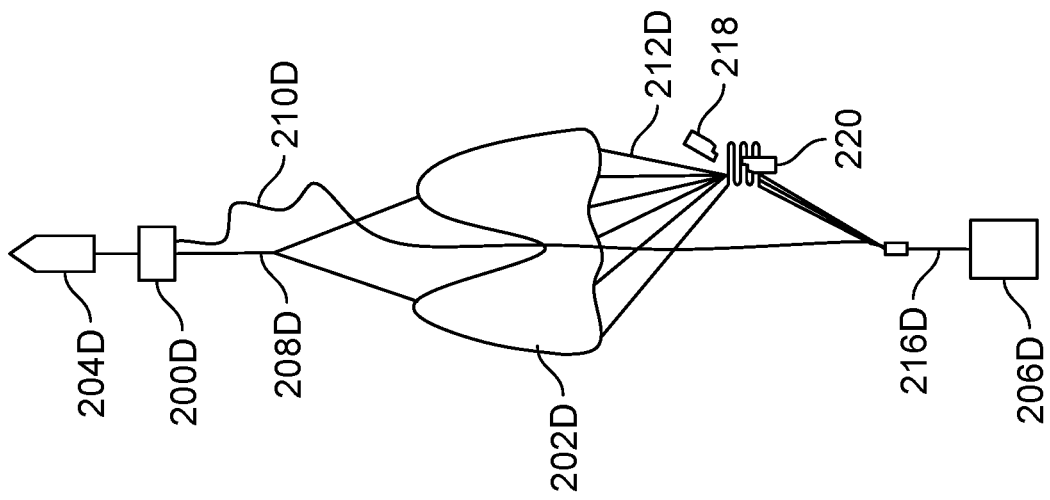
FIG. 2D is a diagram illustrating an embodiment of a parachute deployment system during release of a lower parachute line, canopy line, and/or suspension line restrainer.
Figure 2C:
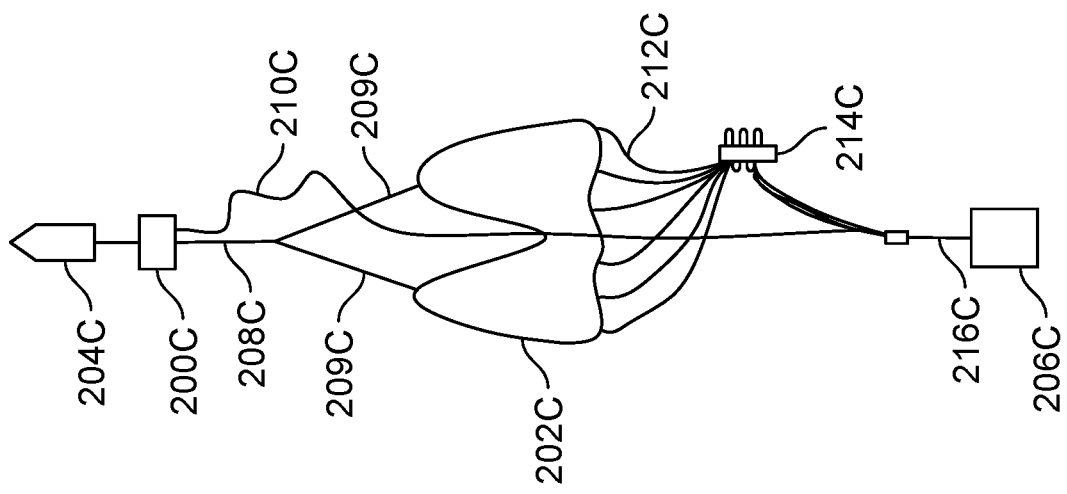
FIG. 2C is a diagram illustrating an embodiment of a parachute deployment system wherein the parachute is towed via a tow line.

FIG. 2C is a diagram illustrating an embodiment of a parachute deployment system wherein the parachute is towed via a tow line. In the example shown, canopy 202C has been extracted and is no longer in the can (not shown). Rocket 204C tows release 200C. Release 200C is attached to canopy 202C via tow line 208C and upper parachute lines (209C) which are sometimes referred to as crown lines. Suspension lines 212C extend from canopy 202C and a portion of the lines is held in lower parachute line restrainer 214C, shortening the effective lengths of the lines. Release line 210C extends from release 200C. Suspension lines 212C and release line 210C are attached to riser 216C.

As shown, rocket 204C is towing canopy 202C upwards via tow line 208C and therefore tow line 208C is taut. Release line 210C is slack in the state shown. In some embodiments, the length of release line 210C is longer than the combined length of the tow line, canopy length between the tow line and suspension lines, and suspension lines held in lower parachute line restrainer 214C. In this initial extraction state, neither the tow line nor the release line are under load. As the rocket travels further from the payload, the combined length of tow line 208C, suspension lines 212C, and riser 216C are pulled taut. Once that occurs, the portion of the canopy between the tow line and suspension lines is also pulled taut. At this point, the parachute is fully extracted from the can. The rocket pulls upwards on the combined length while the payload exerts a downwards force on the combined length due to inertia. The tow line is under load, whereas the release line remains slack and is not under load. The load path from the rocket to the payload travels through the tow line, suspension lines held in the restrainer, and riser rather than traveling through the release line and riser because the release line is longer in length than the combined length of the tow line, suspension lines held in the restrainer, and intermediaries such as the portion of the canopy between the tow line and suspension lines or lines used to attach the tow line to the canopy.

FIG. 2D is a diagram illustrating an embodiment of a parachute deployment system during release of a lower parachute line, canopy line, and/or suspension line restrainer. For simplicity, a lower parachute line restrainer is described in this example, but in other embodiments a restrainer is associated with a canopy line and/or suspension line (e.g., in addition to or as an alternative to a lower parachute line). In this example, the lower parachute line restrainer is configured to release under a first threshold force. In some embodiments, the lower parachute line restrainer is configured to release after the parachute is fully extracted from the can. For example, the first threshold force is equal to a force the lower parachute restrainer experiences in the event the suspension lines are pulled taut. In some embodiments, the first threshold force is equal to a force that the lower parachute line restrainer experiences in the event of sustained load on the suspension lines. For example, the lower parachute line restrainer will not break immediately in the event the suspension lines are pulled taut, but a short time after due to the forces exerted by the rocket and payload. In some embodiments, the first threshold force is determined based on experimental data. The type of lower parachute line restrainer may be chosen based on the first threshold force. The lower parachute line restrainer may be calibrated based on the first threshold force. For clarity, suspension lines 212D and lower parachute line restrainer pieces 218 and 220 are shown pulled to the side so that they are not obscured by release line 210D. In actuality, the suspension lines 212D may be pulled straight (e.g., between the rocket and payload) when the lower parachute line restrainer breaks or otherwise releases.

In the example shown, lower parachute line restrainer pieces 218 and 220 have broken off of suspension lines 212D. The suspension lines as shown have been released from their shortened position and released from their taut, shortened position. Tow line 208D is taut. Release line 210D is slack. As rocket 204D continues traveling upwards away from payload 206D, both lines may first be slack because both are too long to restrain the rocket initially. As the rocket continues traveling or the payload continues falling, load will eventually transition to release line 210D due to its shorter length compared to the longer combined length of the tow line, canopy portion, and suspension lines (no longer shortened by the lower parachute line restrainer).

Figure 2F:
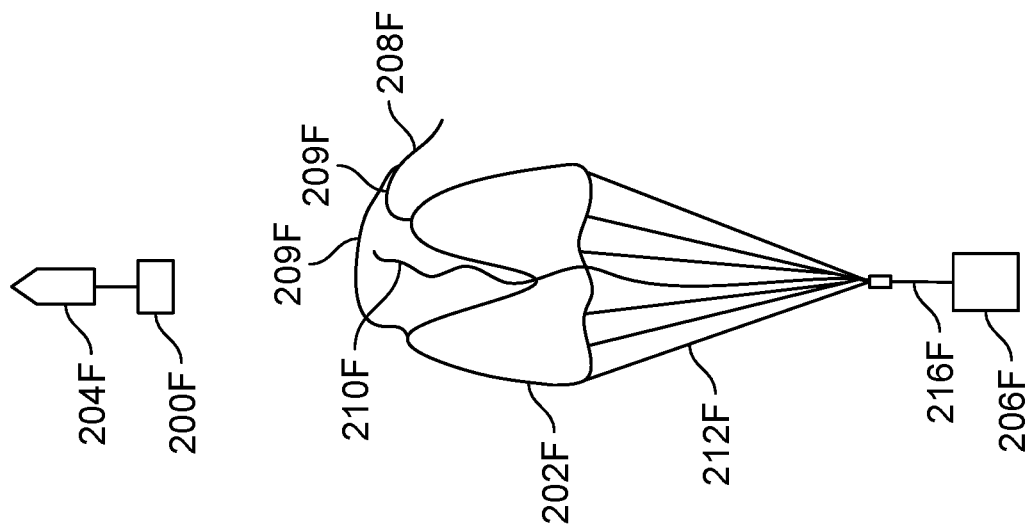
FIG. 2F is a diagram illustrating an embodiment of a parachute deployment system wherein the parachute is separated from a rocket.
Figure 2E:
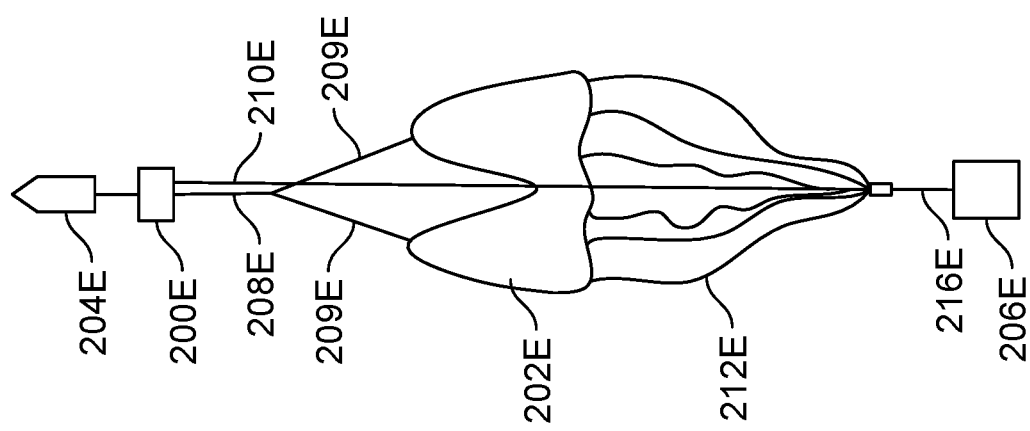
FIG. 2E is a diagram illustrating an embodiment of a parachute deployment system wherein the tow load imparted by the rocket is transferred to a release line.

FIG. 2E is a diagram illustrating an embodiment of a parachute deployment system wherein the tow load imparted by the rocket is transferred to a release line. It is noted that the parachute isn't actually towed at this point. In the example shown, suspension lines 212E are at their full, unrestrained length. The suspension lines 212E are slack because the load has shifted to release line 210E such that release line 210E is taut. The load path from rocket 204E to payload 206E now comprises release line 210E and riser 216E. In some embodiments, the release line is attached to the center line and then to the riser. The release line is shorter in length than the combined length of the length of tow line 208E, the upper parachute or crown lines (209E), the length of the portion of canopy 202E that is in between the tow line and the suspension lines, and the length of one suspension line.

The release line is configured to open release 200E under a second threshold force. Some examples of the release are described in more detail below. In some embodiments, the second threshold force is a low force. The second threshold force may be lower than the first threshold force required to release the lower parachute line restrainer. A desired level of force for the second threshold force may be determined experimentally. In the event the release line is under the second threshold force, release 200E opens. In some embodiments, the opening of release 200E allows the parachute and rocket to separate with little or no recoil.

FIG. 2F is a diagram illustrating an embodiment of a parachute deployment system wherein the parachute is separated from a rocket. In the example shown, rocket 204F remains tethered to release 200F. The rocket and release are separated from the parachute and payload. Release line 210F and tow line 208F and upper parachute lines 209F dangle from canopy 202F. In some embodiments, canopy 202F completely fills following detachment of the rocket.

In some embodiments, a parachute deployment system includes other components and/or is configured in some other manner not shown here. The following figure describes one such alternate.

Figure 3:
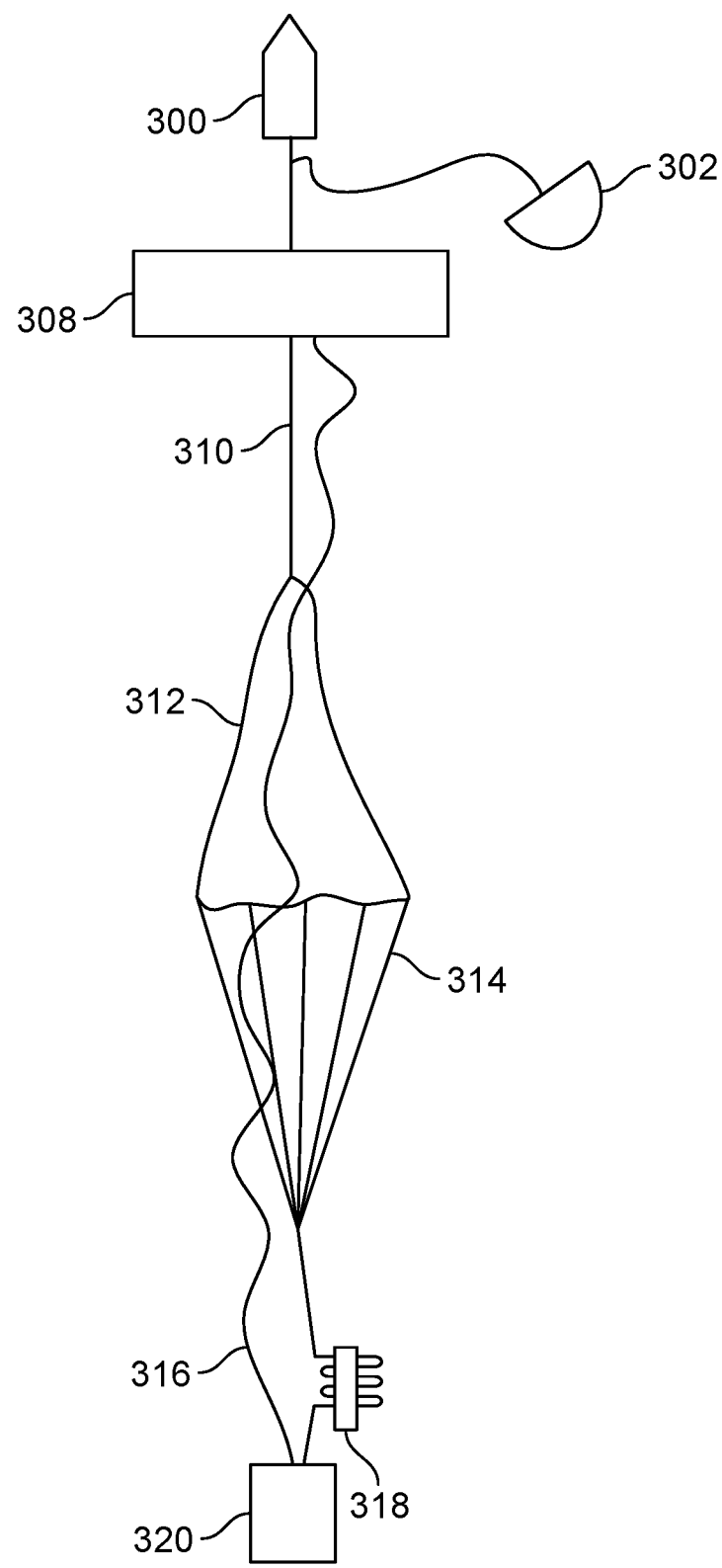
FIG. 3 is a diagram illustrating an embodiment of a parachute deployment system.

FIG. 3 is a diagram illustrating an embodiment of a parachute deployment system. In this example, the rocket 300 has an attached parachute 302 that allows the rocket to float to the ground. The parachute may be installed for safety to prevent the rocket from impacting a person or object at a high speed and causing damage.

In various embodiments, the parachute is towed from different points on its canopy and this figure shows an example different from that shown in the previous figures. In this example, tow line 310 is attached at the apex of canopy 312. Canopy 312 is extracted in a roughly triangular cross-section shape.

In various embodiments, the lower end of the release line is attached at different points. For example, the release line as shown is attached to the payload directly. In some embodiments, the release line is attached to a riser of the parachute.

In some embodiments, the lower parachute line restrainer restrains a riser of the parachute rather than suspension lines. In the example shown, lower parachute line restrainer 318 holds a riser of the parachute in a position such that its effective length is shortened. For example, loops of the riser are folded back and forth and secured. Release line 316 is longer than a combined length of the length of tow line 310, a length from apex to opening of canopy 312, a length of one suspension line of suspension lines 314, and the riser as restrained by lower parachute line restrainer 318. In the event lower parachute line restrainer 318 is released, the release line is shorter the prior described combined length.

In some embodiments, the relative lengths concept remains the same regardless of positioning of the release line, tow line, and lower parachute line restrainer. For example, a first load path which includes the tow line is initially longer than a second load path which includes the release line. Following release of the lower parachute line restrainer, the first load path is shorter than the second load path, which eventually causes the load path to change.

In some embodiments, the parachute deployment system includes a rip stitch (not shown here). A rip stitch is a fabric piece that is designed to rip in order to absorb shock when the parachute deploys, reducing line loading and thus reducing recoil. In some embodiments, a rip stitch is placed at the very bottom of the riser and/or at the bottom of the suspension lines.

The following figure describes the examples above more generally and/or formally in a flowchart.

Figure 4:
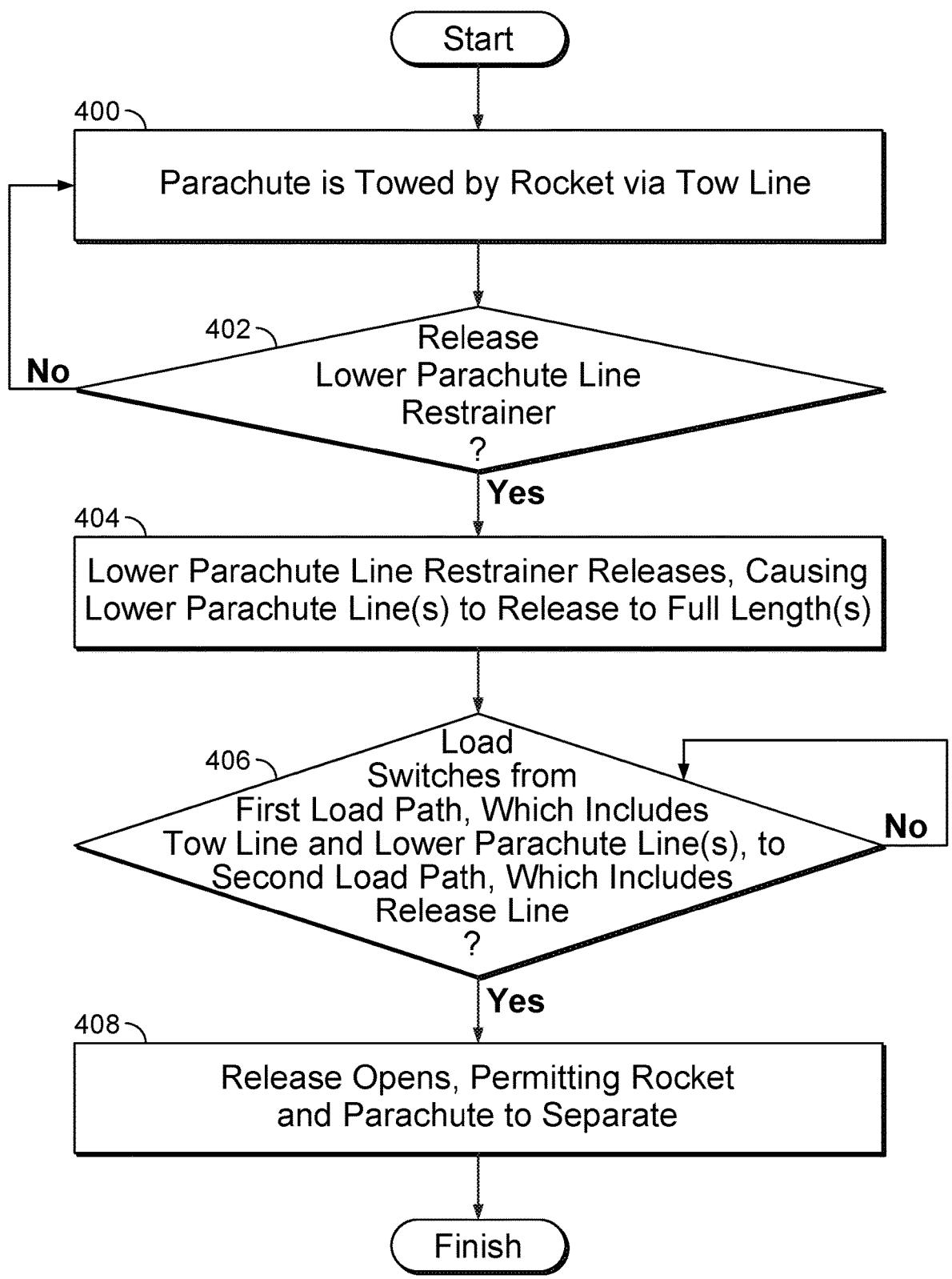
FIG. 4 is a flow diagram illustrating an embodiment of a parachute deployment system process.

FIG. 4 is a flow diagram illustrating an embodiment of a process to deploy a parachute, including release of a rocket.

At 400, a parachute is towed by a rocket via a tow line. For example, the rocket begins traveling upwards and away from the payload. As the rocket travels upwards, a release is first pulled out from being stowed (e.g., the rocket is attached to the release), followed by a canopy of the parachute, followed by suspension lines of the parachute. Either suspension lines or a riser of the parachute are held in a lower parachute line restrainer. See, for example FIGS. 2A-2C.

At 402, it is determined whether to release a lower parachute line restrainer. For example, a lower parachute line restrainer may be designed to release if the lower parachute line restrainer is subjected to a force greater than a first threshold force. In the event the lower parachute line restrainer is not subjected to a force greater than the first threshold force, the parachute continues to be towed by the rocket via the tow line. For example, the rocket continues pulling upwards on the tow line. The payload continues exerting a downwards force on the tow line. See, for example, FIG. 2C.

In the event it is determined to release the lower parachute line restrainer, at 404 the lower parachute line restrainer releases, causing the one or more lower parachute lines to release to their full lengths. In some embodiments, the lower parachute line restrainer effectively shortens the lengths of the one or more lower parachute lines and they are restored to their full length following the release of the lower parachute line restrainer. See, for example FIG. 2C where the lower parachute lines are folded and tied using the lower parachute line restrainer, which reduces their effective length. The release of the lower parachute line restrainer may comprise breakage, snapping, fraying, or any other release. The change in relative lengths causes the tow line to become slack (e.g., because its effective length increases). In some embodiments, the release line eventually becomes taut (e.g., because the increase in the effective lengths of the lower parachute lines causes the load path which includes the release line to be shorter than the load path which includes the now-released lower parachute lines).

At 406, it is determined whether a load switches from a first load path which includes the tow line and the lower parachute lines to a second load path which includes a release line. For example, because the lower parachute lines are now released, that load path now has a longer effective length than the load path which includes the release line. Eventually, the load path which includes the release line will be pulled taut, switching the load onto that line. See, for example, FIG. 2E.

In the event the load switches from the first load path which includes the tow line and the lower parachute lines to the second load path which includes the release line, at 408 the release opens, permitting the rocket and the parachute to separate. In some embodiments, the release line is configured to open the release if a second threshold force is exceeded (e.g., the tow line and release line are configured to separate from the release in the event the release line experiences a force greater than the second threshold force). For example, one or both of the lines may be released from a latch or cut using a cutter. More detailed examples of the release are described below.

In some embodiments, the release remains with the rocket. The tow line and the release line separate from the release, allowing the parachute to be separated from the rocket and released. See, for example, FIG. 2F.

The following figure provides some context for the process of FIG. 4 (e.g., with respect to which line is bearing the load at various steps in FIG. 4).

Figure 5:
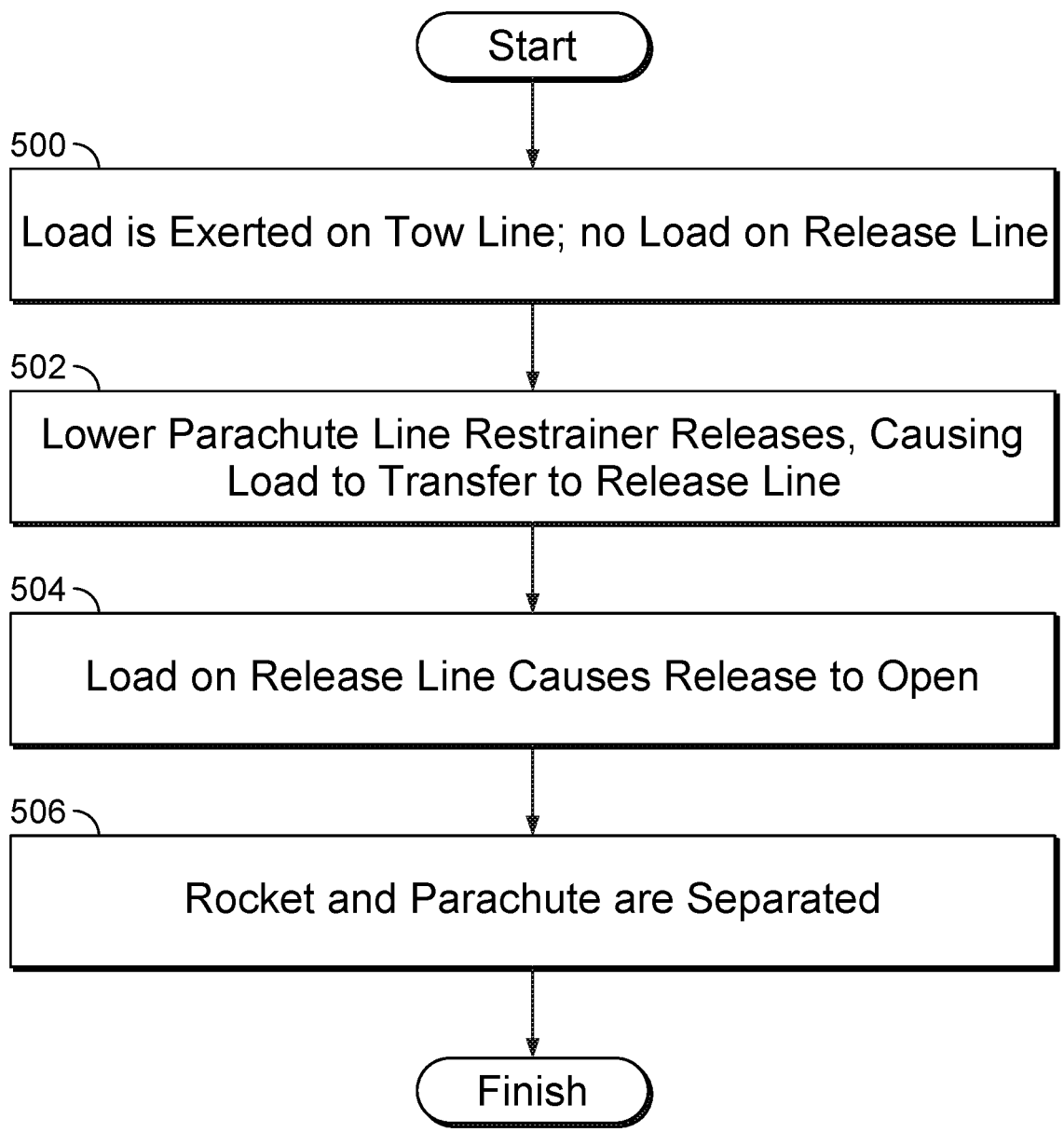
FIG. 5 is a flow diagram illustrating an embodiment of a parachute deployment system process.

FIG. 5 is a flow diagram illustrating an embodiment of a parachute deployment process with load-bearing context. In this example, context for various steps in FIG. 4 is provided, primarily with regard to which line is bearing the load at various steps. In some embodiments, both the tow line and the release line are under no load at the beginning of parachute extraction (e.g., before the rocket is ignited). Both lines are slack as the rocket begins to propel away from the payload. Two load paths are available that connect the rocket and the payload. A first load path including the tow line is (initially) shorter than a second load path including the release line (e.g., because one or more lower parachute lines are wound up and tied, effectively shortening them). As the distance between the rocket and the payload reaches the length of the first load path, line elements in the first load path become taut and are under load. The second load path is not loaded and line elements in the second path are slack. At 500, the tow line is under load and there is no load on the release line. In the context of FIG. 4, step 500 may describe step 400.

At 502, the lower parachute line restrainer releases, causing load to transfer to the release line. This step relates to steps 404 and 406 in FIG. 4. Release of the lower parachute line (see step 404 in FIG. 4) causes the first load path to be longer than the second load path by extending the (e.g., effective) length of a line element of the first load path (e.g., a riser or suspension lines). In some embodiments, both load paths are momentarily not loaded upon the extension of length of the first load path. As the distance between the rocket and the payload reaches that of the second load path, either due to the payload dropping or the rocket propelling upwards, line elements in the second load path such as the release line are pulled taut. See, e.g., step 406 in FIG. 4. In some embodiments, the second load path experiences only a small load before triggering the release to open. The full line load of the tow line may not be transferred to the release line.

At 504, the load on the release line causes the release to open. See step 408 in FIG. 4. In some embodiments, the lower parachute line restrainer is configured to release when the parachute is fully extracted. In quick succession, the release is subsequently opened which allows separation of the rocket and parachute. The tow line experiences a large load (e.g., which is good for deploying the parachute quickly and at high speed and/or low altitudes) whereas the release line experiences a small load (e.g., which is good for little or no recoil) before quickly triggering release. Once the parachute is fully extracted, the rocket is no longer needed.

At 506, the rocket and the parachute are separated. The rocket is safely removed without causing a rebound or reactionary movement from the parachute.

As described above, a release may comprise a variety of components. The following figures describe some examples where the release includes a latch and a cutter. For clarity, the exemplary release is described at various points at time.

Figure 6A:
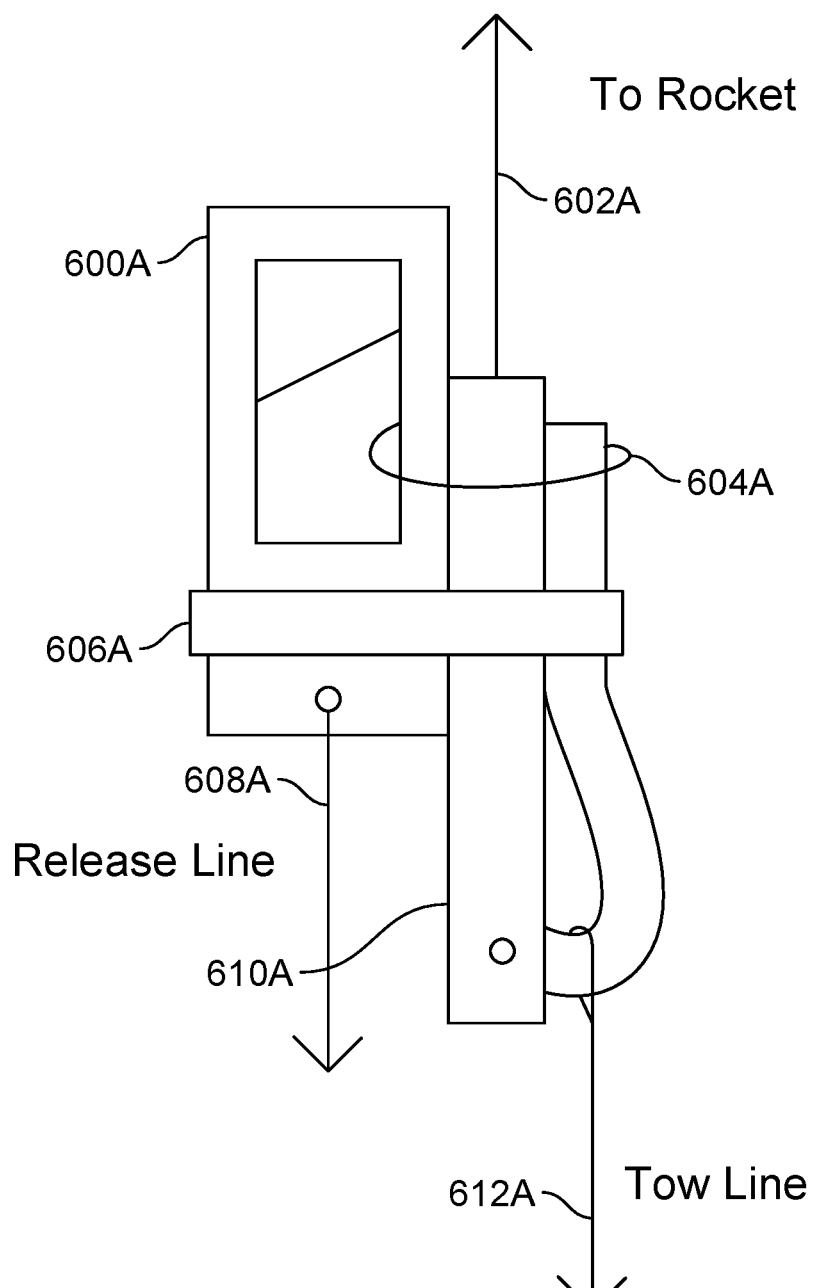
FIG. 6A is a diagram illustrating an embodiment of a release comprising a latch and a cutter.

FIG. 6A is a diagram illustrating an embodiment of a release comprising a latch and a cutter. In some embodiments, release 104 of FIG. 1 is implemented as shown here. In this example, the load on the release line causes a cutter to be pulled downwards. The cutter is pulled down on a line, binding, or wrapper that holds a latch shut, causing the latch to open. A tow line held in the latch is released.

In the example shown, cutter 600A and latch 610A are positioned adjacent to each other. Latch 610A as shown comprises a rectangular component and a curved component. Generally speaking, the latch is U-shaped with a hinge so that the curved part can swing away from the rectangular part. In this example, the curved part is shaped to provide a mechanical advantage such that the high tow line load can be reacted by a lower latch restrainer load on 604A. This allows the latch restrainer to be smaller, which makes it easier to cut (e.g., it lowers the cut and/or release load).

Latch restrainer 604A as shown holds latch 610A in a closed position (e.g., with all parts of the latch forming a continuous loop without an opening or break). For example, the latch restrainer clamps two top ends of the latch together so that the latch cannot open. Latch restrainer 604A may comprise a line or a strip of fabric. In this example, latch restrainer 604A is made of a material that is able to be cut with a blade, such as cotton or nylon.

In the example shown, latch restrainer 604A loops through cutter 600A. In some embodiments, latch restrainer 604A is exposed to a blade of the cutter through some other configuration or relative positioning of the blade and latch restrainer. For example, a blade is able to access and cut through the latch restrainer based on relative positions of the cutter and latch. In some embodiments, the latch restrainer is threaded through holes in the latch and/or cutter. For example, the latch restrainer comprises a line that is threaded through a hole at the end of the rectangular component of the latch, a hole in an end of the curved component of the latch, and through a hole in the side of the cutter.

In the example shown, release system restrainer 606A is positioned around cutter 600A and latch 610A. In various embodiments, the release system restrainer comprises a zip tie, a line, a strip of fabric, or any appropriate restrainer which tears or releases when sufficient force or load is exerted downward on release line 608A and/or upward on line 602A to the rocket. In some embodiments, the release system restrainer maintains the positions of the cutter and the latch relative to each other. For example, latch restrainer 604A does not securely hold the positioning of the cutter and the latch by itself. The release system restrainer holds the cutter in a position where the blade of the cutter is not in contact with the latch restrainer. In some embodiments, the release system restrainer is configured to break or release under a specific threshold force. In the event the specific threshold force is exerted on the release system restrainer, cutter 600A will move downward (e.g., due to tension in the release line) and cut latch restrainer 604A, causing latch 610A to open. For example, the release system restrainer breaks in the event the release line is under the second threshold force.

Tether 602A is attached to the top of the latch 610A as shown and attaches the latch to a rocket. Tow line 612A is held inside of latch 610A (e.g., tow line 612A is threaded through or around latch 610A). In some embodiments, tow line 612A implements tow line 108 of FIG. 1. As shown, the tow line has a loop at its end and the curved component of the latch is positioned in the loop. The tow line is not permanently attached to the latch. Release line 608A extends from the bottom of cutter 600A. In some embodiments, release line 608A implements release line 114 of FIG. 1.

Figure 6B:
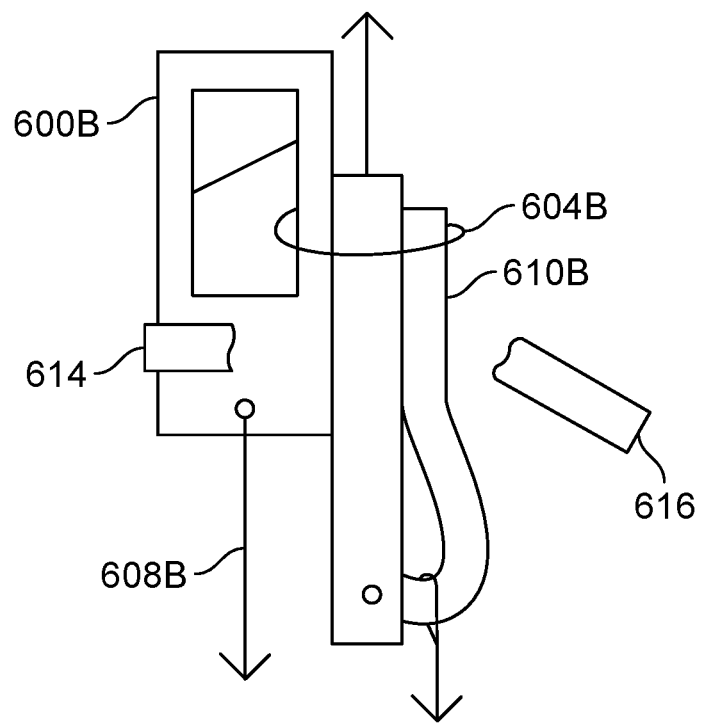
FIG. 6B is a diagram illustrating an embodiment of a release wherein a release system restrainer is broken.

FIG. 6B is a diagram illustrating an embodiment of a release wherein a release system restrainer is broken. In the event release line 608B is under load, a force is exerted on the release system restrainer. In the event the force exerted on the release system restrainer exceeds the specific threshold force of the release system restrainer, the release system restrainer breaks or releases. In the example shown, release system restrainer pieces 614 and 616 have broken off. Cutter 600B and latch 610B are shown in their positions immediately as the release system restrainer is breaking off. In the example shown, latch restrainer 604B remains intact.

Figure 6C:
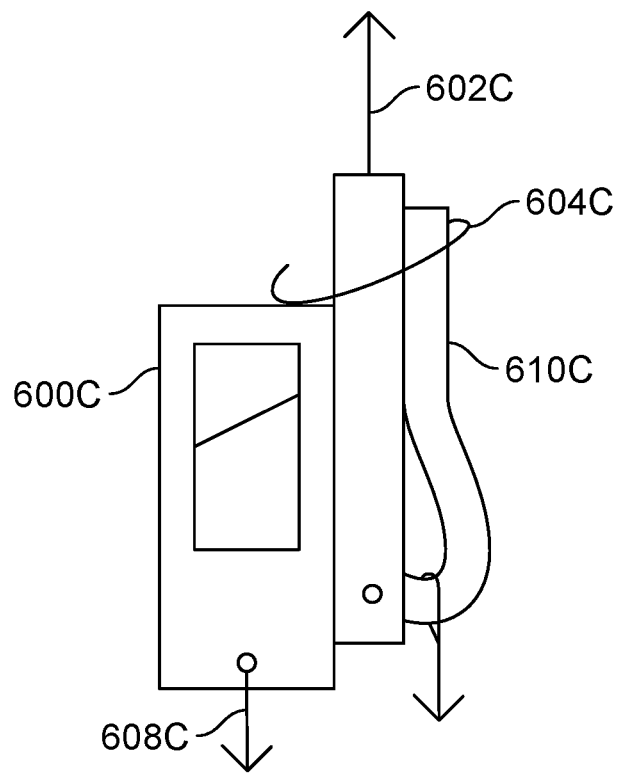
FIG. 6C is a diagram illustrating an embodiment of a release wherein a latch restrainer is broken.

FIG. 6C is a diagram illustrating an embodiment of a release wherein a latch restrainer is broken. In some embodiments, without the release system restrainer intact, the cutter falls downwards relative to the latch. For example, the cutter falls because it is being pulled by release line 608C and the latch is towed upwards by the rocket via line 602C. In the example shown, cutter 600C drops in its position relative to latch 610C, severing latch restrainer 604C. Following the severance of latch restrainer 604C, cutter 600C remains attached to the parachute via release line 608C but is no longer attached to latch 610C or the rocket. Latch 610C remains tethered to the rocket via line 602C. At the moment shown, latch 610C is in a closed position.

Figure 6D:
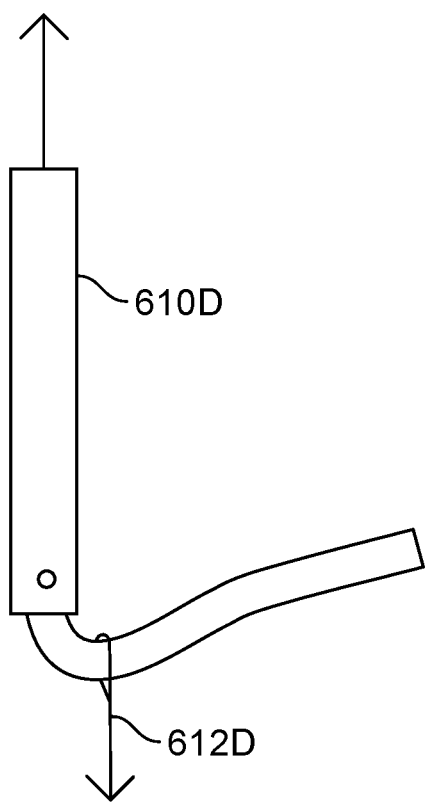
FIG. 6D is a diagram illustrating an embodiment of a release wherein a latch is open.

FIG. 6D is a diagram illustrating an embodiment of a release wherein a latch is open. After the latch restrainer is cut, the latch opens (e.g., the curved part of the latch has rotated about a hinge, causing it to separate from the rectangular part of the latch). Latch 610D is shown in an open position. Tow line 612D as shown remains on the curved component of latch 610D. As the rocket tows latch 610D up and away, tow line 612D slips off of latch 610D. In some embodiments, a small additional load on tow line 612D causes the tow line to come off of latch 610D. For example, as the rocket continues flying and the payload continues dropping, tow line 612D is pulled taut and pulled off from latch 610D. In various embodiments, the two halves of the latch may separate to various degrees (e.g., nearly 180° if desired) by adjusting or configuring the hinge as desired. In some embodiments, the two halves of the latch may separate completely after the latch opens.

Because the tow line 612D slips off of open latch 610D, there is very little recoil when the rocket separates from the parachute. In contrast, if a load path (e.g., bearing all of the load) were directly cut or otherwise severed, there would be a significant amount of recoil because of the tension or load on the line prior to the line being cut. As described above, a large amount of recoil is undesirable in some aircraft applications, which makes the techniques described herein useful.

Figure 6E:
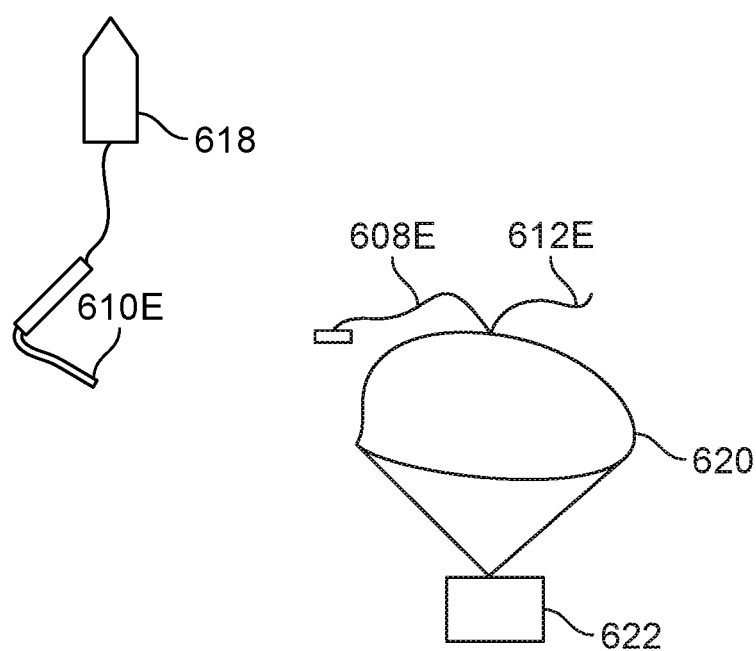
FIG. 6E is a diagram illustrating an embodiment of a parachute deployment system following separation of the parachute and a rocket.

FIG. 6E is a diagram illustrating an embodiment of a parachute deployment system following separation of the parachute and a rocket. The example shown provides an overall view of the parachute deployment system following opening of the release. In the example shown, rocket 618 is attached to latch 610E. After separating, the rocket may tow the latch for a distance and then begin to drop. In some embodiments, the rocket has its own recovery system (e.g., a parachute).

Release line 608E and attached cutter remain attached to parachute 620. Tow line 612E (and upper parachute lines and/or crown lines) also remains attached to parachute 620. As shown, parachute 620 is completely filled and is attached to payload 622.

Figure 7:
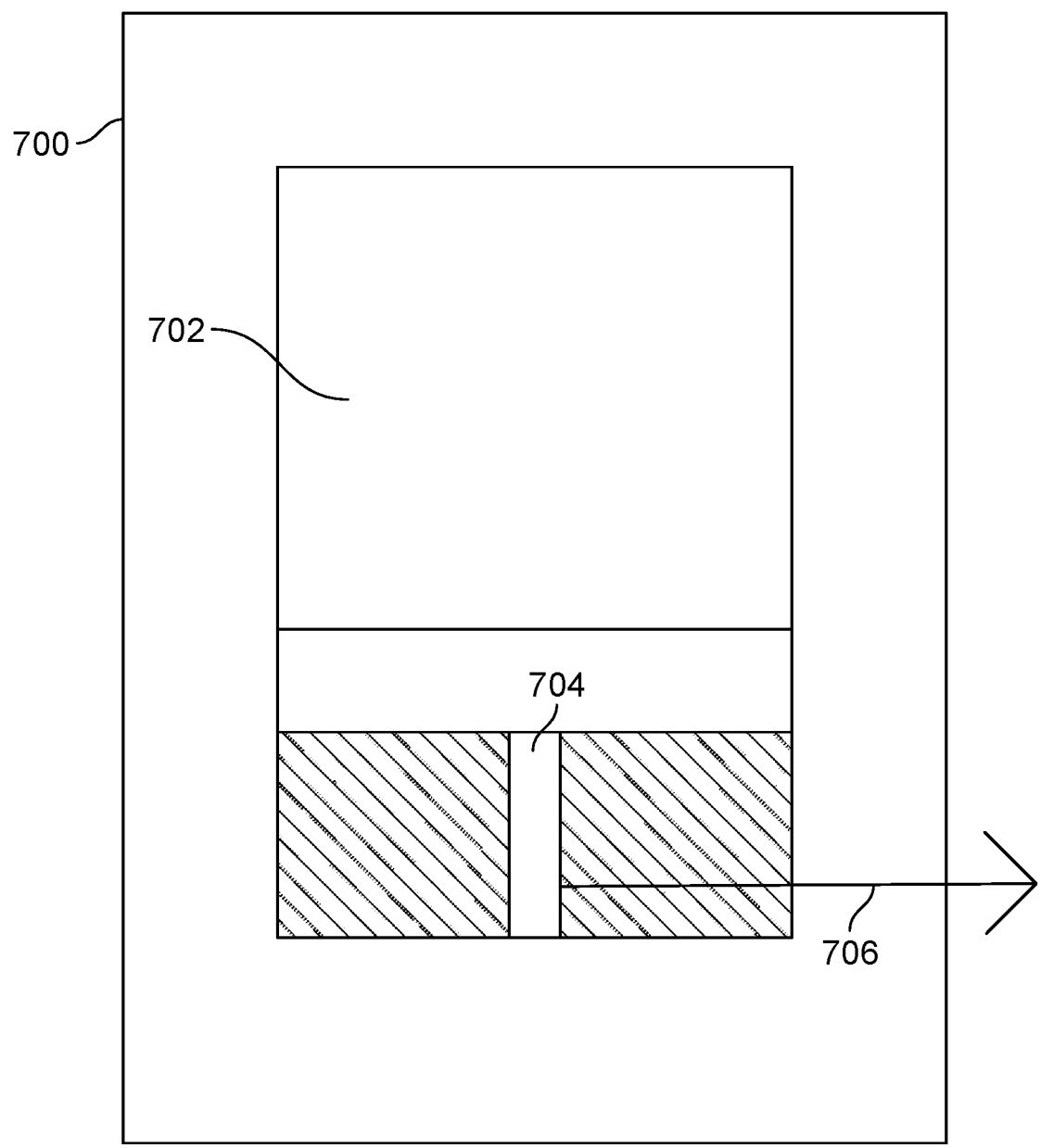
FIG. 7 is a diagram illustrating an embodiment of a cutter.

FIG. 7 is a diagram illustrating an embodiment of a cutter with a channel to thread the latch restrainer through. In various embodiments, the cutter is configured in different ways. In this example, vibrations through lines, movement of the rocket/payload, or environmental factors such as wind may cause the blade of a cutter to come into contact with the latch restrainer earlier than desired (e.g., when the release line is not under load). To address this, the exemplary cutter shown here is configured to minimize chances of accidental severance of the latch restrainer (e.g., caused by vibrations, slipping, etc.).

In the example shown, cutter 700 comprises a blade that is held in a recessed area within a frame. For example, blade 702 is secured such that it cannot rattle or move (e.g., prematurely) from its position in the cutter. Latch restrainer 706 is threaded through a small channel or window in the cutter. Channel 704 is a slim opening through the cutter that allows blade 702 to be pulled down on the latch restrainer and cut the latch restrainer. Using a secured blade and a small channel of access (e.g., through which the latch restrainer is threaded) decreases the chances of unintentional and/or premature cutting of the latch restrainer.

Figure 8:
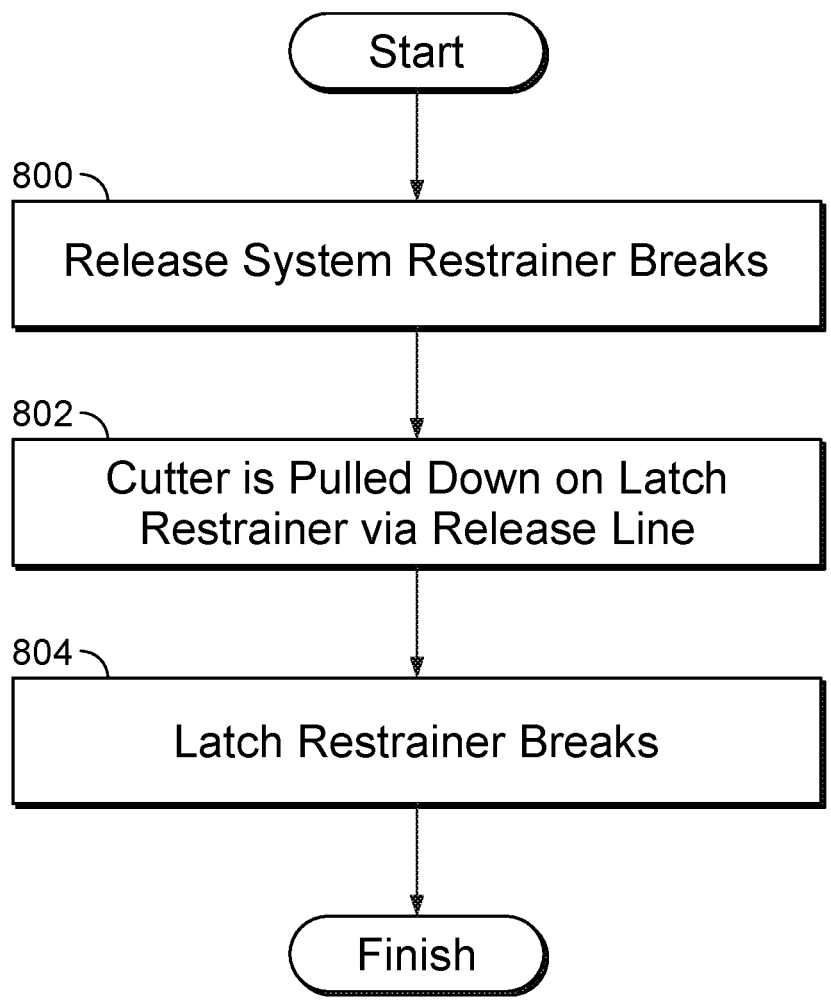
FIG. 8 is a flow diagram illustrating an embodiment of a process to open a release.

FIG. 8 is a flow diagram illustrating an embodiment of a process to open a release. In some embodiments, the process is used at step 408 in FIG. 4. At 800, the release system restrainer breaks. For example, the release system restrainer breaks after a threshold force is exerted on the release line. The release line may be under load following the release of the lower parachute line restrainer, which changes the load path from one including the tow line to one including the release line.

At 802, the cutter is pulled down on the latch restrainer via the release line. For example, the latch restrainer and cutter move relative to each other, causing the blade of the cutter to cut the latch restrainer.

At 804, the latch restrainer breaks. For example, the latch restrainer may be a line or tie that is cut. In some embodiments, the latch opens in the event the latch restrainer breaks. For example, in the previous figures, the latch has a hinge and part of the latch falls open by rotating on the hinge.

As described above, a release may comprise a variety of components. The following figures describe some examples of a release having a soft pin.

Figure 9B:
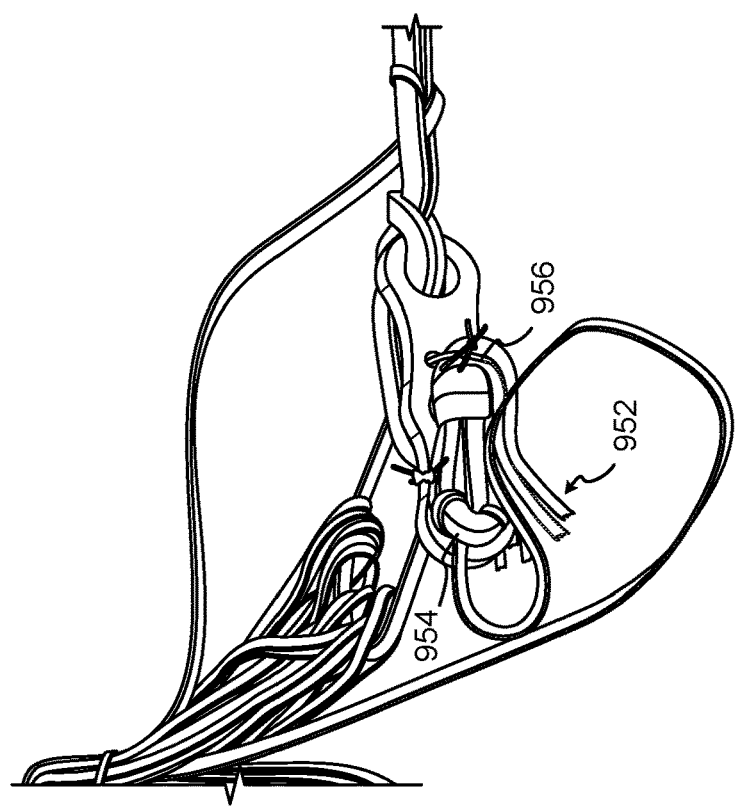
FIG. 9B shows another view of an embodiment of a soft pin release assembly.
Figure 9A:
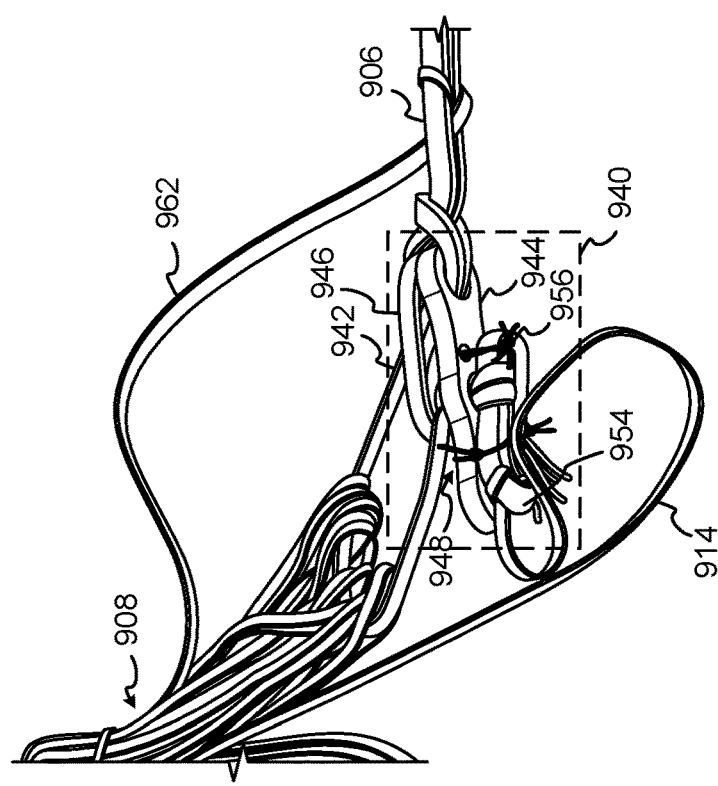
FIG. 9A is a diagram illustrating an embodiment of a soft pin release assembly.

FIG. 9A is a diagram illustrating an embodiment of a soft pin release assembly. Soft pin release assembly 940 is adapted to disengage a rocket from a parachute/payload. Soft pin release assembly 940 is an example of how release 104 of FIG. 1 can be implemented. FIG. 9B shows another view of an embodiment of a soft pin release assembly.

The soft pin release assembly includes release back plate 944, soft pin 954, first line 942, second line 946, guide loop 956, and break ties 948. The soft pin release assembly is passively actuated when a load on release line 914 reaches a threshold force (also called a release force). The soft pin release assembly exploits the rocket momentum and thrust when a parachute reaches a fully extracted state, actuating in response to the release force exerted by the rocket momentum and thrust.

In the example of FIGS. 9A and 9B, the release assembly is in an unactuated state. Release back plate 944 is structured to accommodate soft pin 954. The release back plate can be made of an inflexible material such as metal, plastic, and the like. The release back plate can be made of a flexible material such as nylon, webbing, and the like. Here, soft pin 954 is held in place against release back plate 944 by a loop of the second line 946 (that passes around a portion of the soft pin 954 and through an opening of the release back plate), guide loop 956, and break ties 948.

Soft pin 954 is adapted to minimize mass and inertial loading under acceleration, for example around 500-1000 g acceleration. Soft pin 954 may be made of a flexible material such as cloth, rope, plastic, and the like in order to achieve this property or performance. Unlike conventional metal pins, a soft pin is able to avoid backing itself out of the release back plate. Referring to FIG. 9B, pin pigtails 952 prevent the soft pin from backing itself out even when there is high inertial loading (e.g., load directed to the left of the soft pin). In some embodiments, soft pin 954 is arranged such that approximately half of the pin mass is on each side of guide loop 956 to prevent the pin from sliding in or out under inertial loads.

Guide loop 956 reacts to inertial loading of the soft pin (e.g., at 500-1000 g) as the assembly is accelerated, and does not break. Guide loop 956 is adapted to guide the motion of the soft pin during actuation of the release as more fully described below. In some embodiments, the guide loop is made of a hard material or a ring.

Break ties 948 are adapted to retain the soft pin against the release back plate below the release force, and break in response to loading of the release line (e.g., at the release force). When a release force is met or exceeded, release line 914 tensions, causing the break ties 948 to break (not shown). Consequently, soft pin 954 slips away from the release back plate 944, and crown lines 908 are disengaged from release back plate 944 and the first line 942. The rocket tow line 906 tows the rocket away from the parachute/payload. Break ties 948 can be adapted to respond to a desired release force by selecting a material with a desired strength or by positioning the break tie at various locations along the release back plate.

This release assembly is an example of a two-ring release that reduces the force needed to release compared with other types of assemblies. The two-ring release includes two line lengths in series (here, first line 942 and second line 946). Here, the force required for the pin to react the rocket tow force is around a quarter of the rocket tow force. When (around) the force required to break ties 948 and pull the pin is reached, the release is actuated. Break ties 948 break, allowing soft pin 954 to slip away from release back plate 944, freeing crown lines 908 and the parachute/payload to disengage from the rocket assembly with minimal recoil (e.g., which means less falling or dropping of any attached aircraft or person before the parachute (re)inflates).

Also shown in FIGS. 9A and 9B are other components of a parachute deployment system including crown lines 908, rocket tow line 906, and release line 914. These components are like those described in the other figures unless otherwise described here. Referring to FIG. 10A, rocket tow line 1002 corresponds to rocket tow line 906 of FIG. 9. Returning to FIG. 9, crown release lines 908 are individually looped through first line 942 as shown. First line 942 is looped through second line 946, which is then looped through soft pin 954 to keep the soft pin in place when the release is in an unactuated state as shown. In some embodiments, the crown lines are made of a low mass material to decrease and avoid interference with fast inflation after release.

Bridle 962 is arranged to run from the rocket tow line to a rocket parachute. In a stowed state, the bridle is tucked inside the parachute canopy such as canopy 110 of FIG. 1. The bridle runs to a rocket parachute such as parachute 302 shown in FIG. 3. The rocket parachute canopy is tucked inside a main parachute canopy.

Rocket tow line 906 runs from the release back plate to the rocket. When the release is actuated, the rocket tow line remains coupled to the rocket, and pulls the release back plate away from the crown lines 908 to free the parachute/payload from the rocket assembly including the back plate with minimal recoil.

Release line 914 runs between soft pin 954 and a parachute centerline that runs from the parachute apex to the suspension line confluence point. When a rocket is deployed, the release line is extended as more fully described with respect to FIGS. 2A-2F. In response to tensioning of the release line, the release is actuated by the breaking of the break ties 948. In various embodiments, the release line has ample slack to avoid actuating the release prematurely.

In contrast to the release shown in FIGS. 6A-7, the release of FIGS. 9A and 9B does not require a cutter, which may reduce the weight and increase the reliability of the parachute deployment system. In various embodiments, the soft pin release assembly is tolerant of packing under pressure in a can, which facilitates minimization of stowed parachute volume and clean packaging. The soft pin release assembly, in various embodiments, tolerates chaotic extraction and snatch from the can, and does not release prematurely due to rips, tears, or inertial loads. For example, the soft pin release assembly is agnostic to rotation. On release, the soft pin release assembly avoids tangling and snags. In an alternative embodiment, the release assembly is implemented by a snap shackle.

The following figures show examples of a parachute tow and release system with canopy extraction controlled by drag surface, e.g., controlled drag during parachute extraction. A parachute initiates inflation prior to beginning its downward fall by allowing air to flow in through the parachute crown and spread the skirt for easier inflation once the downward stroke begins. The period during which the parachute is extracted and air flows in through the crown is called the extension stroke, and the beginning of the falling is called the downward stroke. The release mechanism disclosed accommodates high extraction speeds in which the parachute is extracted at around 50-100 mph relative to the airstream. Typically, fast extraction of the parachute causes the parachute to slam against its full extension point, which in turn loads the lines of the parachute and causes recoil. Recoil causes a payload to lose altitude, which is undesirable because of potential payload damage or loss and less time or height for the parachute to slow down any attached aircraft or person. The techniques described here allow control of the extension of the parachute.

In one aspect, the extension stroke can be damped by controlling extension (e.g., in a radially outwards direction) of upper parachute lines. In some embodiments, extension damping is tunable by providing a line constrainer. Example line constrainers are shown in FIGS. 10A and 10B. Because the type/level of damping can be selected or otherwise controlled to some degree, the parachute need not extend with a large amount of momentum and slam against its extension point. Instead, the extension stroke is controlled and the parachute can be extended more slowly towards its extension point. The level of extension is a parameter that can be set or selected.

The following figures show examples of an exemplary parachute deployment system having a line constrainer. The line constrainer restricts extension of upper parachute lines to provide a desired level of extension damping.

FIG. 10A is a diagram illustrating an embodiment of a parachute deployment system including a line constrainer associated with a first area, A1. In the example shown, the system includes rocket 1000, release 1004, line constrainer 1020, and parachute 1010. Each of the system components function like those of FIG. 1 unless otherwise described here.

Rocket 1000 is adapted to extract the parachute from a container. For example, in an unactuated state, the parachute is stored in a cavity or compartment in payload 1018. Prior to deployment, the parachute may be folded inside the cavity, as more fully described with respect to FIGS. 14 and 15. To actuate the parachute, the rocket deploys and pulls the parachute from the container. The momentum of the rocket causes release 1004 to actuate at desired conditions, separating the rocket from the parachute (as described above).

Release 1004 is adapted to disconnect rocket 1000 from parachute 1010 with minimal recoil. The level of extension damping or drag during parachute extraction can be adjusted by selecting certain parameters or characteristics of the line constrainer 1020 as will be described in more detail below. When the load pulls on the release, the release causes the parachute to detach from the rocket. The conditions that cause the release to disengage the parachute from the rocket is more fully described with respect to FIG. 12E. In various embodiments, the release includes a latch, a cutter, a pin (e.g., a soft pin), or the like. In the example shown, rocket 1000 is connected to release 1004 via rocket tow line 1002. In some embodiments, rocket 1000 is permanently attached or connected to release 1004. For example, release 1004 is designed to remain with rocket 1000 following separation of rocket 1000 and parachute 1010. The release can disengage from the parachute in a variety of ways as described with respect to release 104 of FIG. 1 and FIGS. 6A-9B.

Parachute 1010 is adapted to facilitate smooth flight of payload 1018. For example, the parachute is used to help a payload such as an aircraft gently land at a desired location. Parachute 1010 includes a canopy, upper parachute lines 1008, and lower parachute lines 1012 (also called suspension lines). In this example, the upper parachute lines also function as tow lines, and the two terms are used interchangeably. In some embodiments, the tow line is separate from the upper parachute line such as in the system of FIG. 1. Tow line 1008 are adapted to tow the parachute, which is different from the rocket tow line 1002 adapted to tow the rocket.

Tow line 1008 is attached to release 1004 at its upper end. At its lower end, tow line 1008 is attached to a canopy of parachute 1010. In contrast to the example of FIG. 1, here the upper parachute lines 1008 are directly attached to the release. When the parachute is released from release 1004, each of the upper parachute lines individually detaches from the release. This decreases the mass upstream of the parachute that could potentially interfere with the opening of the parachute.

In various embodiments, the upper parachute lines are attached to the canopy in the middle of the canopy, between an apex and outer edge of the canopy. In some embodiments, attaching the tow line to the middle of the canopy or lower on the canopy than its apex allows lower sections of the canopy to be pulled out quickly, providing even distribution of tension across lower parachute lines. In some embodiments, the canopy is stored in the can in a manner that allows the canopy to inflate quickly as described with respect to FIGS. 14 and 15. The ability to quickly extract and inflate the parachute may be especially helpful at lower flight altitudes (e.g., on the order of a few meters), where a delay in parachute inflation may cause a payload (e.g., an attached aircraft or person) to be damaged or lost.

Suspension lines 1012 allow a payload to be suspended from the parachute. Here, the suspension lines 1012 and a release line (not shown) are attached at their bottom ends to riser 1017. Riser 1017 attaches payload 1018 to parachute 1010 via lower parachute lines 1012. Payload 1018 may be any object benefitting from a parachute such as an aircraft, package, human, and the like. In some embodiments, the release line is tied to an apex of canopy 1010, which in turn is tied to the center line, which is tied to the riser.

Figure 12C:
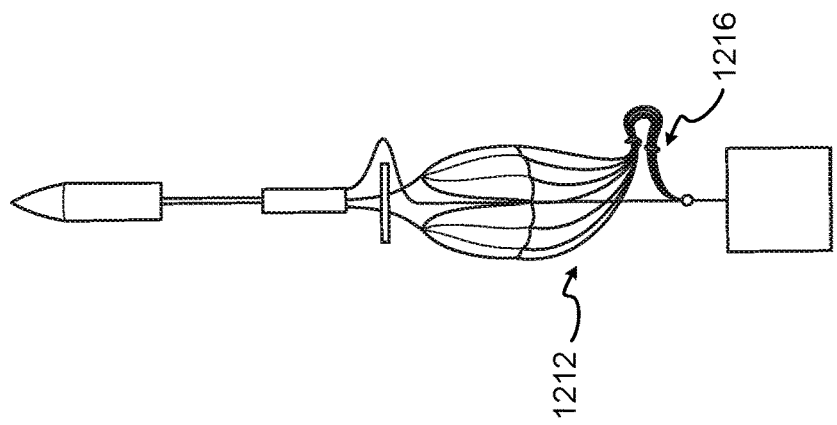
FIG. 12C is a diagram illustrating an embodiment of a parachute deployment system during release of a lower parachute line restrainer.
Figure 12B:
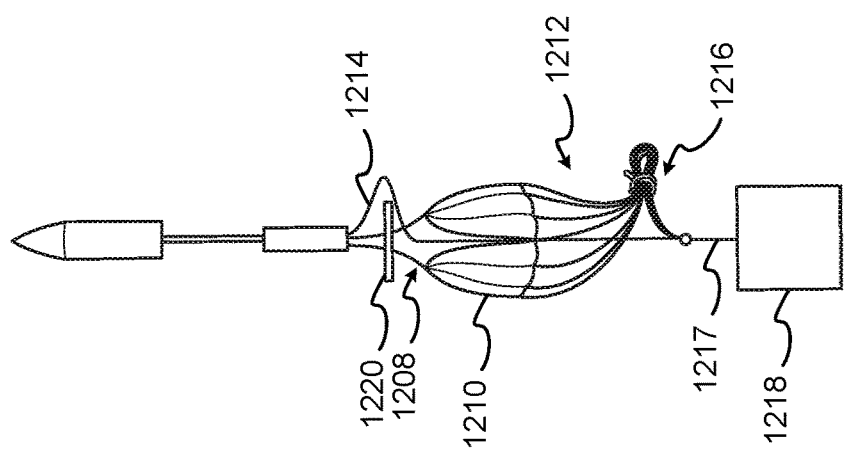
FIG. 12B is a diagram illustrating an embodiment of a parachute deployment system while the parachute is towed via a rocket tow line.

In various embodiments, a portion of the suspension lines is held in a lower parachute line restrainer (not shown) such that the length of the suspension lines is shortened, as more fully described with respect to FIG. 12B. For example, the lower parachute line restrainer can be implemented by a bight, a tied or sewed cloth, a thin plastic tube, a cardboard loop, or the like. The lower parachute line restrainer is configured to release under a threshold force (e.g., due to the rocket pulling away from the parachute). For example, the lower parachute line restrainer is configured to break, rip, tear, or open when subjected to the threshold force.

The number of upper parachute lines, suspension lines, and riser lines can be selected based on the payload or flight conditions. For example, several upper parachute lines (2, 4, 10, 20, or more) can be positioned equidistantly on the canopy. More lines may attach components more securely to each other, but would be heavier than fewer lines. In some embodiments, riser 1017 is implemented by a webbing.

Line constrainer 1020 is adapted to restrict an extent to which the upper parachute lines are able to extend away (e.g., radially outward) from a longitudinal axis (dashed line A1) of the parachute. In various embodiments, the amount of extension damping is directly proportional to an area defined by the extent of the upper parachute lines. In FIG. 10A, the cross-sectional area of the dashed horizontal line through line constrainer 1020 is A1.

FIG. 10B is a diagram illustrating an embodiment of a parachute deployment system including a line constrainer associated with a second area, A2. The example system shown in FIG. 10B includes the same components as the system of FIG. 10A unless otherwise described here. Line constrainer 1030 restricts an extent to which the upper parachute lines are able to extend away from a longitudinal axis of the parachute to area A2. A2 is smaller than A1 because line constrainer 1030 restricts movement of the upper parachute lines to a greater degree compared with line constrainer 1020. In various embodiments, the damping drag force is proportional to the area corresponding to the extent to which upper parachute lines are able to extend away from a longitudinal axis of the parachute. Thus, the system in FIG. 10A has higher damping compared with the system in FIG. 10B.

There are many advantages to using the line constrainer to restrict movement of the upper parachute lines to parametrically tune extension damping. In one aspect, extension damping is tunable. This allows a system to be adapted for a variety of flight situations. For example, if an aircraft (payload of the parachute and rocket system) is expected to fly at relatively low altitude, then the line constrainer can be adjusted or sized to constrain the upper parachute lines to movement within a larger area, which corresponds to high damping. Unlike conventional means to constrain lower parachute lines, the line constrainers in the examples shown in FIGS. 10A and 10B constrain the upper parachute lines.

The sizing of a cutout in the line constrainer controls how much air passes through a mid-channel of the parachute. The shape of the canopy due to airflow through the canopy helps the parachute to inflate more quickly. For example, the larger cross-sectional area A1 of FIG. 10A relative to the cross-sectional area A2 of FIG. 10B means that the parachute of FIG. 10A will inflate more quickly when a similarly sized cutout allows air to pass through the line constrainer into the canopy on extraction. The operation of the parachute deployment system is more fully described with respect to FIGS. 12A-12F.

The line constrainer can be implemented by various materials. For example, the line constrainer can be made of a flexible material with holes through which the upper parachute lines pass. The line constrainer can be made of a rigid material. The line constrainer can be a variety of shapes such as a disk, polygon, or the like. In some embodiments, the line constrainer includes a cutout to promote airflow to facilitate quick parachute inflation. For example, the line constrainer can be a ring or other shape with a cutout. The following figures show examples of the line constrainer.

Figure 11B:
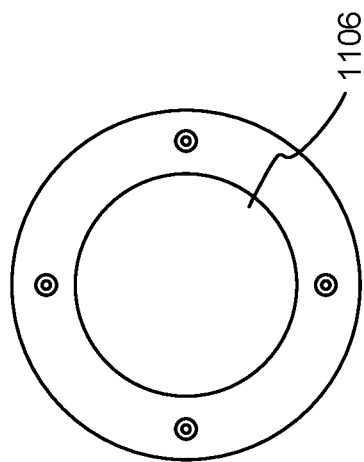
FIG. 11B is a diagram illustrating an embodiment of a circular line constrainer.
Figure 11A:
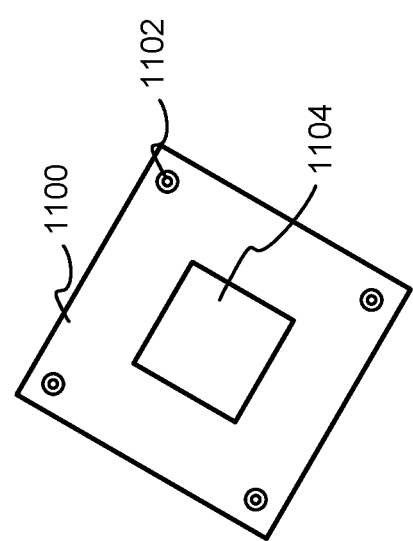
FIG. 11A is a diagram illustrating an embodiment of a rectangular line constrainer.

FIG. 11A is a diagram illustrating an embodiment of a rectangular line constrainer. In FIG. 11A, the line constrainer is rectangular with a rectangular cutout 1104. FIG. 11B is a diagram illustrating an embodiment of a circular line constrainer. In FIG. 11B, the line constrainer is circular with a circular cutout 1106.

The body of the line constrainer can be made of various materials. In some embodiments, the line constrainer is made of a flexible material such as nylon. For example, grommets in the line constrainer for line pass-through can be made of metal. In some embodiments, the line constrainer is made of an inflexible material such as metal or hard plastic with spaces for line pass-through. The cutout 1104 allows air to flow through the line constrainer. The cutout can be open, mesh, or the like.

In the embodiments shown here, grommets are provided on the line constrainer to guide crown lines into place in a parachute deployment system. For example, referring to FIG. 10A, a line constrainer such as the ones shown in FIGS. 11A and 11B is provided between a release 1004 and parachute 1010. Crown lines 1008 pass through the grommets of the line constrainer to (removably) couple the parachute to the release 1004. Returning to FIGS. 11A and 11B, four grommets 1102 are provided along the perimeter of the line constrainer. For example, the grommets may be provided near (e.g., within some threshold distance of) the perimeter. Although this example shows four grommets, any number of grommets (e.g., suitable for the number of crown lines in the parachute deployment system) may be provided.

The sizing of the line constrainer affects the level of extension damping. In various embodiments, the outer diameter (or perimeter) is proportional to a level of damping (because in these examples at least, the grommets are positioned near the outer diameter of the line constrainers shown). As discussed with respect to FIGS. 10A and 10B, a relatively large area bounded by the line constrainer causes higher damping than a smaller area. Thus, a line constrainer with a relatively larger diameter (or perimeter) causes higher damping than a line constrainer with a smaller diameter (or perimeter).

The sizing of the (e.g., center) cutout of the line constrainer affects the amount of air inflow through the line constrainer to the canopy causing the canopy to inflate. In various embodiments, the cutout 1104 is sized based on a desired level of air inflow. A relatively larger cutout permits more air inflow than a smaller cutout. The desired air inflow may depend on the size of a parachute canopy. Typically a smaller parachute requires less air flow to inflate than a larger parachute. The desired air inflow may depend on a target speed of parachute inflation. More air inflow permits a parachute to be inflated more quickly. Referring to FIGS. 11A and 11B, cutout 1104 is smaller than cutout 1106. Thus, a canopy of the same size would inflate more quickly than in a system that has the line constrainer shown in FIG. 11B compared with FIG. 11A. The shape of the cutout shown here is merely exemplary and is not intended to be limiting. The cutout can be sized to permit a desired volume of air inflow.

The following figures show examples of the exemplary parachute deployment system at various points in time in order to better illustrate how the parachute deployment system works and how it is able to disconnect the rocket with tunable extension damping (e.g., little or no recoil).

Figure 12A:
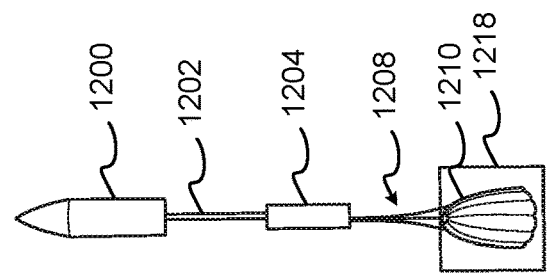
FIG. 12A is a diagram illustrating an embodiment of a parachute deployment system following rocket deployment.

FIG. 12A is a diagram illustrating an embodiment of a parachute deployment system following rocket deployment. In this state of deployment, rocket 1200 begins traveling away from can 1218 (here, substantially up), causing release 1204 (which is coupled to the rocket via rocket tow line 1202) to be pulled out from the can. The release is attached to the parachute via tow line 1208 and the release line (not shown). In this example, the crown lines are the same as the tow lines. Parachute 1210 remains stowed inside can 1218. In some embodiments, the canopy of the parachute is stored in the can in the manner more fully described with respect to FIGS. 14 and 15. The can is stored on or in a payload of the rocket. The can may comprise a cavity or compartment in an aircraft where the parachute deployment system is stored.

FIG. 12B is a diagram illustrating an embodiment of a parachute deployment system while the parachute is towed via a tow line. In this state of deployment, the rocket continues traveling away from can 1218, causing parachute 1210 to be pulled out from the can. This state is sometimes called the "initial extraction state." As shown, the extent to which the crown lines 1208 are able to extend away from a longitudinal axis of the parachute is restricted by line constrainer 1220. The lower parachute lines 1212 extend from the skirt of the parachute, and a portion of the lower parachute lines is held in lower parachute restrainer 1216, shortening the effective lengths of the lines. The lower parachute lines 1212 and release line 1214 are coupled to riser 1217.

In this state, the tow line 1208 is taut and the release line 1214 is slack. In some embodiments, the length of release line 1214 is longer than the combined length of the crown line 1208, canopy length between the crown line and lower parachute lines, and lower parachute lines held in lower parachute line restrainer 1216. In this initial extraction state, neither the tow line nor the release line are under load except for the load on the tow lines required to pull the canopy out of the can.

As the rocket travels farther away from the payload, the combined length of tow line 1208, suspension lines 1212, and riser 1217 are pulled taut. In response, the portion of the canopy between the tow line and lower parachute lines is also pulled taut. At this point, the parachute is fully extracted from the can. The rocket pulls upwards on the combined length while the payload exerts a downwards force on the combined length due to inertia. The tow line is under load, whereas the release line remains slack and is not under load. The load path from the rocket to the payload travels through the tow line, suspension lines held in the restrainer, and riser rather than traveling through the release line and riser because the release line is longer in length than the combined length of the tow line, suspension lines held in the restrainer, and intermediaries such as the portion of the canopy between the tow line and suspension lines or lines used to attach the tow line to the canopy.

FIG. 12C is a diagram illustrating an embodiment of a parachute deployment system during release of a lower parachute line restrainer. In this example, the lower parachute line restrainer is configured to release under a first threshold force. The lower line restrainer 1216 breaks into pieces as shown to allow the lower parachute lines to extend to their full lengths. In some embodiments, the lower parachute line restrainer is configured to release after the parachute is fully extracted from the can. For example, the first threshold force is equal to a force the lower parachute restrainer experiences in the event the lower parachute lines are pulled taut. In some embodiments, the first threshold force is equal to a force that the lower parachute line restrainer experiences in the event of sustained load on the suspension lines. For example, the lower parachute line restrainer will not break immediately in the event the suspension lines are pulled taut, but a short time after due to the forces exerted by the rocket and payload. In some embodiments, the first threshold force is determined based on experimental data.

The type of lower parachute line restrainer may be chosen based on the first threshold force. The lower parachute line restrainer may be calibrated based on the first threshold force. For clarity, lower parachute lines 1212 and lower parachute line restrainer pieces are shown pulled to the side so that they are not obscured by the release line. In various embodiments, the lower parachute lines may be pulled straight (e.g., between the rocket and payload) when the lower parachute line restrainer breaks or otherwise releases.

In the example shown, lower parachute line restrainer pieces have broken off of lower parachute lines 1212. The suspension lines as shown have been released from their taut, shortened position. The tow line is taut, and the release line is slack. As the rocket continues traveling upwards away from the payload, both lines may both be slack because both are too long to restrain the rocket initially. As the rocket continues traveling or the payload continues falling, load will eventually transition to the release line due to its shorter length compared to the longer combined length of the tow line, canopy portion, and lower parachute lines (no longer shortened by the lower parachute line restrainer). For simplicity, a lower parachute line restrainer is described in this example, but in other embodiments a restrainer is associated with a canopy line (e.g., in addition to or as an alternative to a lower parachute line).

Figure 12F:
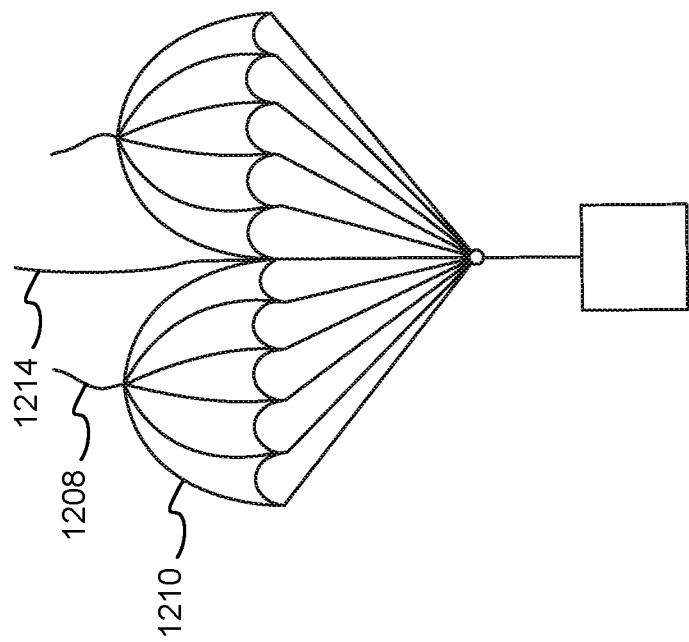
FIG. 12F is a diagram illustrating an embodiment of a parachute deployment system with a fully deployed parachute.
Figure 12E:
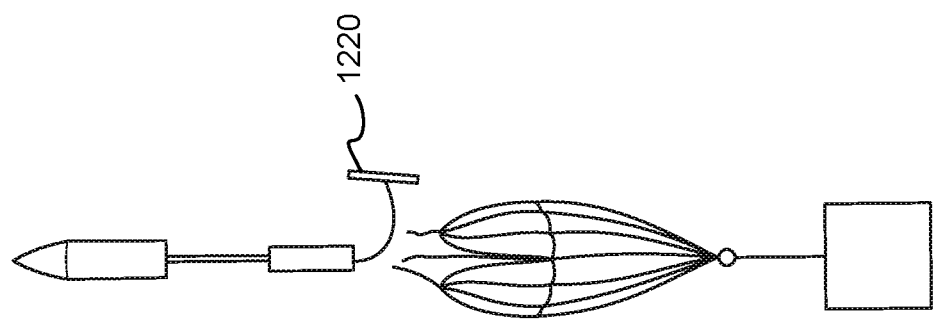
FIG. 12E is a diagram illustrating an embodiment of a parachute deployment system following separation of the parachute from the rocket.
Figure 12D:
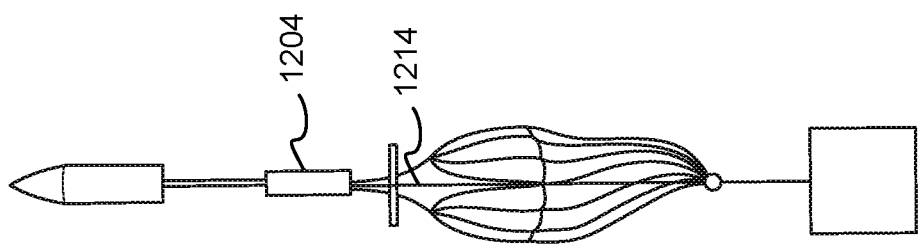
FIG. 12D is a diagram illustrating an embodiment of a parachute deployment system following the shifting of a load from a first load path to a second load path.

FIG. 12D is a diagram illustrating an embodiment of a parachute deployment system following the shifting of a load from a first load path to a second load path. Here, the load shifts to release line 1214. In the example shown, the lower parachute lines are at their full, unrestrained length. The lower parachute lines are slack because the load has shifted to release line 1214 such that the release line is taut. The load path from the rocket to the payload now includes release line 1214 and the riser. As described above, in some embodiments, the release line is attached directly from the release to the bottom of the suspension lines. In other embodiments, the release line is attached the center line and then to the riser. The release line is shorter in length than the combined length of the length of the tow line, the crown lines, the length of the portion of canopy that is in between the tow line and the lower parachute lines, and the length of one lower parachute line.

The release line is configured to actuate release 1204 under a second threshold force. Some examples of the release are described in more detail with respect to FIGS. 6A to 9B. In some embodiments, the second threshold force is lower than the first threshold force (e.g., the first threshold force is the force to release the lower parachute line restrainer). In some embodiments, actuation of the release allows the parachute and rocket to separate with little or no recoil.

FIG. 12E is a diagram illustrating an embodiment of a parachute deployment system following separation of the parachute from the rocket. In this example, as part of the actuation of the release, each of the crown lines individually release to minimize mass inhibiting inflation of the parachute. Although line constrainer 1220 is shown attached to the release here, in other embodiments, the line constrainer may simply detach and fall off. In the example shown, the rocket remains tethered to the release. The rocket and release are separated from the parachute and payload. In various embodiments, the release line and crown (tow) line remain attached to the canopy of the parachute. In some embodiments, the canopy completely fills following separation from the rocket as shown in FIG. 12F.

Although in this example, crown lines 1208 is pictured as being relatively short, the crown lines may instead by sized of sufficient length to allow full deployment of the parachute canopy without being constrained by the crown lines. For example, when the rocket and/or release malfunctions (e.g., rocket fails to release), the canopy is able to completely fill because the crown lines are of sufficient length to allow the canopy to fully open. When a rocket release failure is detected, a line constrainer (if one is used) slips axially upward to the top of the crown lines, and crown lines are permitted to extend to full length to facilitate full filling of the canopy. In other words, the crown lines extend without interfering with full inflation of the canopy.

FIG. 12F is a diagram illustrating an embodiment of a parachute deployment system with a fully deployed parachute. The end of parachute extraction is sometimes called an "end stroke," and the beginning of the parachute falling is called a "down stroke." FIG. 12E shows a parachute end stroke, and FIG. 12F shows a parachute down stroke. There is little or no recoil on the end stroke. The line constrainer allows the level of damping of the end stroke to be controlled. In various embodiments, the release line 1214 and crown (tow) lines 1208 remain attached to the canopy 1210 of the parachute as shown.

In some embodiments, the extent to which crown lines are able to extend away from a longitudinal axis of a parachute of a parachute deployment system can be limited without a line constrainer. For example, fixed crown line lengths produce a desired cross-sectional area without needing to provide a line constrainer.

Figure 13:
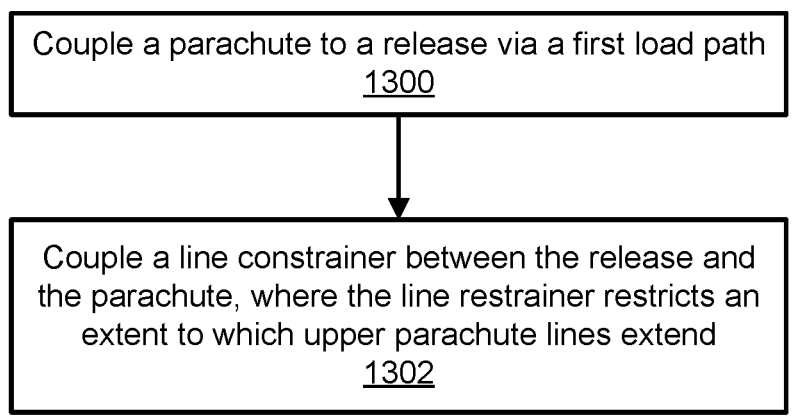
FIG. 13 is a flow diagram illustrating an embodiment of a process to manufacture a parachute deployment system including a line constrainer.

FIG. 13 is a flow diagram illustrating an embodiment of a process to manufacture a parachute deployment system including a line constrainer. The process can be implemented by a parachute deployment system assembler, such as a programmed robotic arm or by manual efforts. The process can be used to manufacture a parachute deployment such as the one shown in FIGS. 10A and 10B.

At 1300, a parachute is coupled to a release via a first load path. Referring to FIG. 10A, parachute 1010 is coupled to release 1004 via a first load path. The first load path is made up of crown lines 1008. The parachute can be removably coupled to the release such that the parachute is separated from the release (and rocket) during parachute deployment as described here. Examples of the release are shown in FIGS. 6A-9B.

In various embodiments, coupling the parachute to the release includes assembling a parachute system (such as the one shown in FIGS. 10A and 10B) for extraction via a load path through the upper parachute lines, canopy, and suspension lines, and for release via a release line. The release line length may be tuned so that substantially all tension is taken through the release line when the extraction load path is unconstrained. The suspension line restrainer size can be tuned to leave ample slack in the release line when the extraction load path is under tension.

Returning to FIG. 13, at 1302, a line constrainer is coupled between the release and the parachute. The line constrainer restricts an extent to which crown lines are able to extend away from a longitudinal axis of the parachute.

The extension of the crown lines can be selected based on a desired level of extension damping. As more fully described with respect to FIGS. 10A and 10B, greater extension of the crown lines corresponds to greater extension damping. In various embodiments, the line constrainer includes grommets through which crown lines are extended. One end of the crown lines is coupled to the release, and the other end of the crown lines is coupled to the canopy of the parachute.

The line restrainer is installed on the upper parachute lines above the canopy, where the line constrainer is able to restrict an extension of the upper parachute lines radially outward away from the longitudinal axis of the parachute system. In various embodiments, the components of the parachute system including the release are integrated with connections and ties prior to packing the parachute into a container/can.

In various embodiments, the parachute deployment system is packed into a can. The parachute is stored in an un-deployed state, and is extracted in the sequence shown in FIGS. 2A-2F or FIGS. 12A-12F. The parachute can be stored in a manner to promote quick inflation when deployed as described with respect to the following figures.

In various embodiments, the parachute deployment system has features to promote airflow through a top of the canopy to speed up inflation of the parachute and decrease recoil. Air inflow through the top (canopy) of the parachute helps the parachute inflate quickly once the downward stroke begins, without substantial dropping, by spreading the skirt during the extension stroke. The manner in which the parachute is packed into its can affects the speed of inflation. For example, a tightly packed and rolled parachute inflates slowly and results in more altitude loss during parachute inflation. The following figures illustrate examples of how air inflow is promoted by packing the parachute in the manner described.

Figure 14:
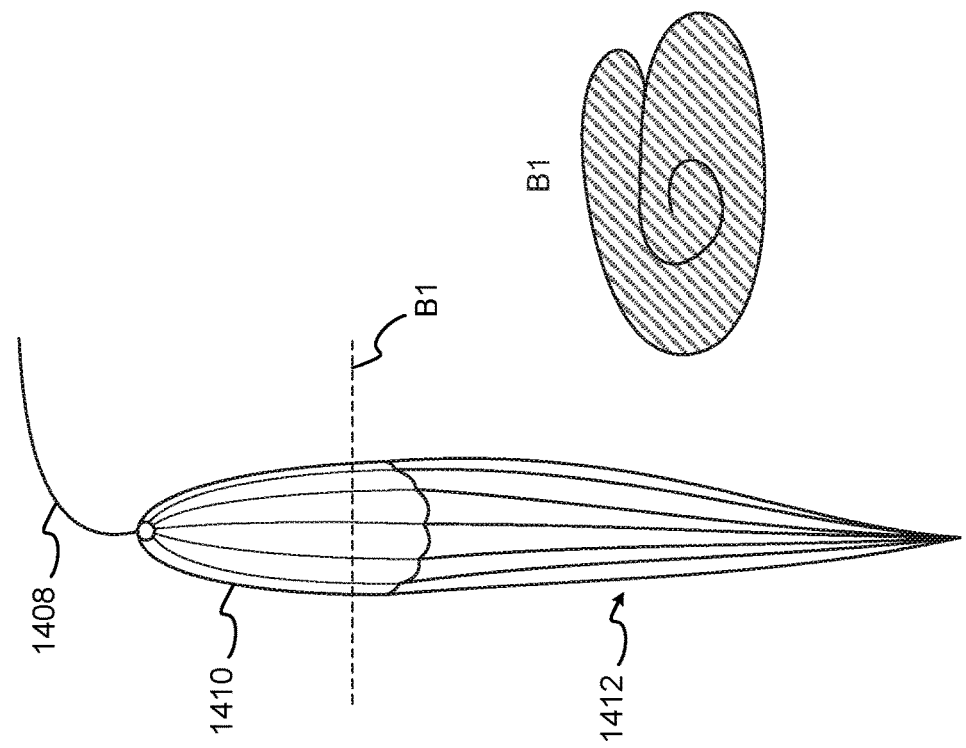
FIG. 14 is a diagram illustrating an embodiment of a conventional parachute in a conventional packed state.

FIG. 14 is a diagram illustrating an embodiment of a conventional parachute in a conventional packed state. In this example, the parachute includes upper parachute lines 1408, canopy 1410, and lower parachute lines 1412. The cross section at dashed line B is shown as B1. The canopy may have vent lines or holes allowing air to pass through and provide stability while the parachute is in flight. During a packing process, the parachute is then compressed and rolled into a cylindrical shape (e.g., where the parachute is rolled up like a sleeping bag or cinnamon bun) as shown in B1 (i.e., so that the hem is no longer loose). Although this form of packing may be appropriate for conventional parachutes (e.g., without a line constrainer to constrain the upper parachute lines), this type of packing may be less than desirable for parachutes with a line constrainer. The following figure shows a better packing shape for such parachutes.

Figure 15:
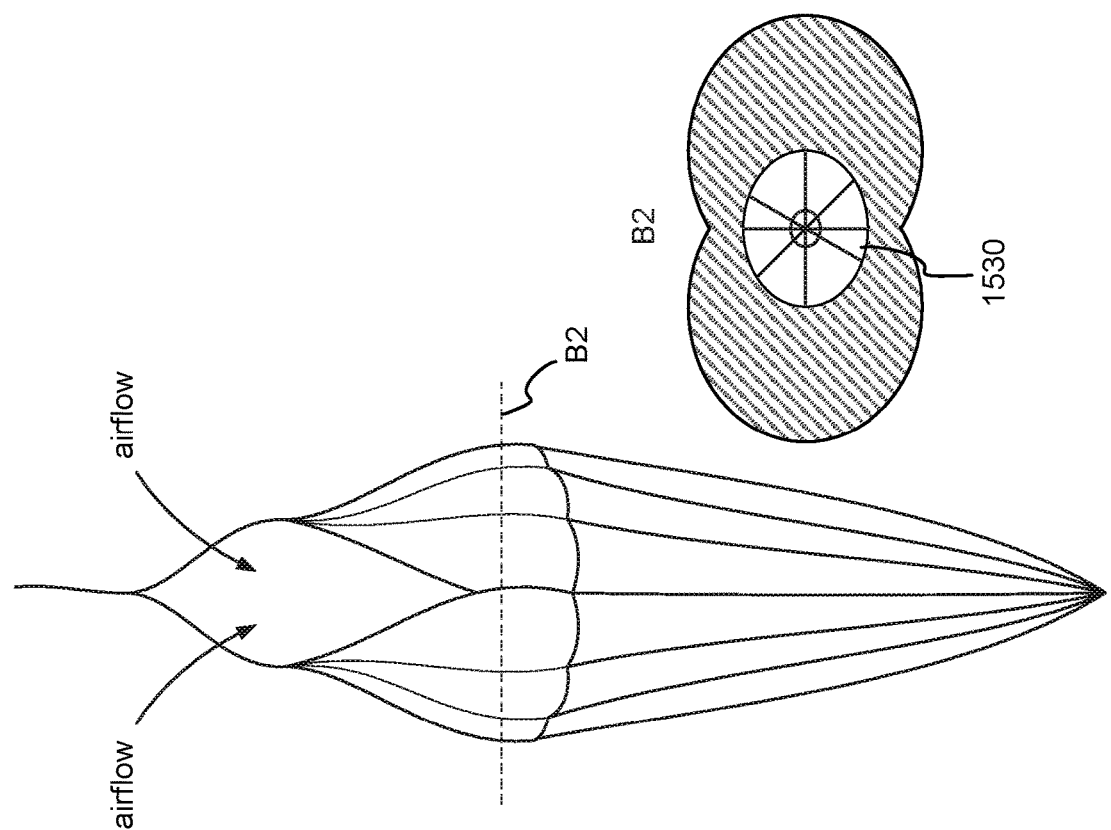
FIG. 15 is a diagram illustrating an embodiment of a parachute in a symmetrically packed state.

FIG. 15 is a diagram illustrating an embodiment of a parachute in a symmetrically packed state. Packing the parachute symmetrically is good for airflow down the center channel, symmetry as the parachute is extracted, and even loading as the parachute reaches full extension. Although not shown herein, in some embodiments the exemplary parachute system includes a line restrainer on its upper parachute lines. The cross section at dashed line B is shown as B2. As shown, there is an opening 1530 that allows air inflow through the canopy. Due to the parachute moving through the air as it is extracted, air is pumped through the parachute through the crown (a center channel of the canopy) to facilitate inflation of the canopy as represented by the airflow arrows.

To help with airflow and more quickly inflate the parachute, the exemplary parachute is packed in an "M" cross-sectional shape designed to inflate quickly. The parachute is packed symmetrically with respect to a longitudinal axis of the parachute. Here, the longitudinal axis comes out of the page, and parachute material is evenly distributed about the axis to facilitate even loading upon extraction. By contrast, the packed parachute in FIG. 14 does not have an equal amount of material distributed around the longitudinal axis. Instead, most of the mass is on top of the longitudinal axis, because the location of the canopy apex is in the bottom layer of the rolled up parachute. Thus, when the parachute in FIG. 14 is extracted, loading is uneven and the parachute needs to unroll before air flows through a center channel of the canopy. This tends to make the inflation of the parachute relatively slow, uneven, and unsteady. To put it another way, instead of rolling the parachute (as shown in FIG. 14), the parachute is pulled and folded together evenly from all directions toward the longitudinal axis before being compressed in the can. In some embodiments, the hem remains loose rather than rolled into the folds of the parachute.

The various embodiments of the disclosed system are capable of recovering a payload (e.g., an attached aircraft or person) at low altitude and low speed conditions and are also adaptable to high speed or high altitude conditions. The parachute deployment system tolerates high loads during initial extraction of the parachute, but actuates release of the rocket with a low load and low recoil. The disclosed system may be packed into a small space and is low in mass. In some embodiments, the disclosed parachute deployment system tolerates chaotic extraction and is agnostic to rotation.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A release assembly for a parachute deployment system, the release assembly comprising:
    a release back plate configured to couple a rocket tow line to upper parachute lines of a parachute, wherein the release back plate includes a plurality of openings;
    a first line, wherein the first line passes through a first opening of the release back plate to form a loop holding the rocket tow line in place prior to release;
    a second line, wherein the second line passes through a second opening of the release back plate to form a loop; and
    a soft pin coupled to the release back plate and a release line, wherein prior to release, the soft pin is held in place via the loop formed by the second line passing through the release back plate and during release the soft pin is adapted to separate from the release back plate in response to tensioning of the release line causing a parachute to disengage from a rocket.

2. The release assembly of claim 1, wherein the upper parachute lines are individually looped around the first line, and the first line is looped around the second line.

3. The release assembly of claim 1, wherein the release assembly is adapted to:
    attach the parachute to the rocket via the upper parachute lines; and
    disengage the parachute from the rocket in response to a load shifting from a first load path to a second load path.

4. The release assembly of claim 1, wherein the release assembly is provided in the parachute deployment system, and the parachute deployment system includes:
    a parachute coupled to the release assembly via a first load path, wherein the first load path includes the upper parachute lines attached to a canopy of the parachute;
    the release assembly, wherein the release assembly is adapted to:
        attach the parachute to the rocket via the upper parachute lines; and
        disengage the parachute from the rocket in response to a load shifting from the first load path to a second load path; and
    a line constrainer between the release assembly and the parachute, wherein the upper parachute lines pass through the line constrainer, and the line constrainer is adapted to restrict an extent to which the upper parachute lines are able to extend away from a longitudinal axis of the parachute.

5. The release assembly of claim 4, wherein the line constrainer includes a flexible piece of material having at least one opening within a threshold distance from a perimeter of the piece of material through which the upper parachute lines pass.

6. The release assembly of claim 4, wherein the line constrainer includes a cutout permitting airflow through the line constrainer.

7. The release assembly of claim 4, wherein the line constrainer includes an annular ring having a plurality of openings corresponding to respective ones of the upper parachute lines through which the upper parachute lines extend.

8. The release assembly of claim 4, wherein the upper parachute lines are connected directly to the release assembly.

9. The release assembly of claim 4, wherein in response to a malfunction of at least one of the release assembly and the rocket, the upper parachute lines extend without interfering with full inflation of the canopy.

10. The release assembly of claim 4, wherein the parachute is packed symmetrically with respect to the longitudinal axis such that, on extraction, loading is substantially even and air flows through a center channel of the canopy.

11. The release assembly of claim 4, wherein the first load path includes at least one lower parachute line, and the second load path extends from the release assembly to a common point with the at least one lower parachute line.

12. The release assembly of claim 11, wherein the at least one lower parachute line extends from a rim of the parachute to a lower parachute line restrainer.

13. The release assembly of claim 11, further comprising a lower parachute line restrainer coupled to the parachute via the at least one lower parachute line, wherein, when released, the lower parachute line restrainer permits the at least one lower parachute line to extend in length.

14. The release assembly of claim 11, further comprising a lower parachute line restrainer coupled to the parachute via the at least one lower parachute line, and adapted to release in response to meeting a threshold force such that the load shifts from the first load path to the second load path.

15. The release assembly of claim 4, wherein the first load path is configured to be shorter than the second load path before release of a lower parachute line restrainer.

16. The release assembly of claim 4, wherein the first load path is configured to be longer than the second load path after release of a lower parachute line restrainer.

17. The release assembly of claim 4, wherein the first load path includes a tow line and the rocket is adapted to tow the parachute via the tow line.

18. A method of producing a release assembly, the method comprising:
- providing a release back plate to couple a rocket tow line to upper parachute lines of a parachute, wherein the release back plate includes a plurality of openings; and
- providing a first line, wherein the first line passes through a first opening of the release back plate to form a loop holding the rocket tow line in place prior to release;
- providing a second line, wherein the second line passes through a second opening of the release back plate to form a loop;
- coupling a soft pin to the release back plate and a release line, wherein prior to release, the soft pin is held in place via the loop formed by the second line passing through the release back plate and during release the soft pin is adapted to separate from the release back plate in response to tensioning of the release line causing a parachute to disengage from a rocket.

19. The method of claim 18, further comprising:
- individually looping the upper parachute lines around a first line; and
- looping the first line around a second line.

20. The method of claim 19, further comprising looping the second line around the soft pin.

21. The release assembly of claim 1, wherein:
- the first line passes from a first side of the release back plate to a second side of the release back plate via the first opening of the release back plate; and
- the second line passes from the first side of the release back plate to the second side of the release back plate via the second opening of the release back plate.

22. The release assembly of claim 1, further comprising at least one break tie adapted to break and permit the soft pin to separate from the release back plate in response to a threshold release force.

23. The release assembly of claim 1, further comprising a guide loop adapted to couple the soft pin to the release back plate prior to release, wherein substantially half of the mass of the soft pin is on each side of the guide loop prior to release.

* * * * *